(12) United States Patent
Schneider et al.

(10) Patent No.: US 9,389,328 B2
(45) Date of Patent: Jul. 12, 2016

(54) MARINE SEISMIC SURVEYING WITH TOWED COMPONENTS BELOW WATER'S SURFACE

(71) Applicant: ION Geophysical Corporation, Houston, TX (US)

(72) Inventors: Curt Schneider, Katy, TX (US); Timothy A. Dudley, Houston, TX (US)

(73) Assignee: ION Geophysical Corporation, Houston, TX (US)

( * ) Notice: Subject to any disclaimer, the term of this patent is extended or adjusted under 35 U.S.C. 154(b) by 0 days.

(21) Appl. No.: 14/339,736

(22) Filed: Jul. 24, 2014

(65) Prior Publication Data

US 2015/0101420 A1    Apr. 16, 2015

Related U.S. Application Data

(63) Continuation-in-part of application No. 13/793,544, filed on Mar. 11, 2013, which is a continuation-in-part of application No. 12/719,783, filed on Mar. 8, 2010, now Pat. No. 8,593,905.

(Continued)

(51) Int. Cl.
| | |
|---|---|
| *G01L 5/13* | (2006.01) |
| *G01V 1/38* | (2006.01) |
| *B63B 3/38* | (2006.01) |
| *B63G 8/00* | (2006.01) |
| *B63G 8/14* | (2006.01) |

(Continued)

(52) U.S. Cl.
CPC ............... *G01V 1/3843* (2013.01); *B63B 3/38* (2013.01); *B63G 8/001* (2013.01); *B63G 8/14* (2013.01); *B63G 8/42* (2013.01); *G01L 1/247* (2013.01); *G01L 5/136* (2013.01); *B63B 2701/20* (2013.01)

(58) Field of Classification Search
CPC ..... G01L 1/247; G01L 5/136; B63B 2701/20; B63B 3/38; G01V 1/3843
USPC ................................ 73/760, 862.03, 862.393
See application file for complete search history.

(56) References Cited

U.S. PATENT DOCUMENTS

| | | | |
|---|---|---|---|
| 1,625,245 | A | 4/1927 | Grove |
| 1,690,578 | A | 11/1928 | Hammond, Jr. |

(Continued)

FOREIGN PATENT DOCUMENTS

WO    2008140654    11/2008

OTHER PUBLICATIONS

Danish Examination Report from counterpart DK Appl. No. PA 2010 70472, dated Sep. 22, 2011.

(Continued)

*Primary Examiner* — Max Noori
(74) *Attorney, Agent, or Firm* — Blank Rome LLP

(57) ABSTRACT

A seismic spread is constructed having an arrangement of towed components to be neutrally buoyant in water when towed in a seismic survey. The towed components at least include streamers and paravanes. Immersed weight and drag of the towed components is determined, and drag forces versus buoyancy required to neutrally buoy the towed components at at least one tow speed in the water is calculated based on the determined weight and drag of the towed components. Floatation is configured for the seismic spread based on the calculated drag forces versus buoyancy; and the arrangement of the towed components in the seismic spread is constructed with the configured floatation.

12 Claims, 17 Drawing Sheets

Related U.S. Application Data

(60) Provisional application No. 61/158,698, filed on Mar. 9, 2009, provisional application No. 61/246,367, filed on Sep. 28, 2009, provisional application No. 61/261,329, filed on Nov. 14, 2009.

(51) Int. Cl.
  *B63G 8/42* (2006.01)
  *G01L 1/24* (2006.01)

(56) References Cited

U.S. PATENT DOCUMENTS

| | | | |
|---|---|---|---|
| 2,030,768 A | 2/1936 | Shultz | |
| 2,462,568 A | 2/1949 | Steckel | |
| 2,556,423 A | 6/1951 | Gross | |
| 2,566,029 A | 8/1951 | Louthan | |
| 2,692,570 A | 10/1954 | Costa | |
| 2,765,565 A | 10/1956 | Mussio | |
| 3,034,471 A | 5/1962 | Aschinger | |
| 3,159,806 A | 12/1964 | Piasecki | |
| 3,172,510 A | 3/1965 | Lee et al. | |
| 3,336,572 A | 8/1967 | Paull et al. | |
| 3,354,658 A | 11/1967 | Sam | |
| 3,437,987 A | 4/1969 | Burg | |
| 3,497,869 A | 2/1970 | Silverman | |
| 3,583,445 A | 6/1971 | Harbonn et al. | |
| 3,605,668 A | 9/1971 | Morgan | |
| 3,621,380 A | 11/1971 | Barlow, Jr. | |
| 3,635,186 A | 1/1972 | German | |
| 3,703,876 A | 11/1972 | Michelsen | |
| 3,739,736 A | 6/1973 | Carreau et al. | |
| 3,744,014 A | 7/1973 | Greenlaw | |
| 3,810,081 A | 5/1974 | Rininger | |
| 3,886,882 A | 6/1975 | Thornburg et al. | |
| 3,935,829 A | 2/1976 | Lantz | |
| 3,964,424 A * | 6/1976 | Hagemann | B63B 21/66 114/244 |
| 4,004,265 A | 1/1977 | Woodruff et al. | |
| 4,033,277 A | 7/1977 | Schaper | |
| 4,037,189 A | 7/1977 | Bell et al. | |
| 4,047,579 A | 9/1977 | Wilckens et al. | |
| 4,124,990 A | 11/1978 | Bell et al. | |
| 4,139,074 A | 2/1979 | White | |
| 4,189,703 A * | 2/1980 | Bennett | G10K 11/008 114/254 |
| 4,196,688 A | 4/1980 | Lipinsky, Sr. | |
| 4,231,111 A | 10/1980 | Neeley | |
| 4,276,845 A | 7/1981 | Spanner | |
| 4,290,123 A | 9/1981 | Pickens | |
| 4,313,181 A | 1/1982 | Holm | |
| 4,314,363 A | 2/1982 | Thigpen et al. | |
| 4,354,446 A | 10/1982 | Goldsmith et al. | |
| 4,372,420 A | 2/1983 | White | |
| 4,404,664 A | 9/1983 | Zachariadis | |
| 4,520,468 A | 5/1985 | Scherbatskoy | |
| 4,566,083 A | 1/1986 | Thigpen | |
| 4,570,245 A | 2/1986 | Thigpen | |
| 4,581,723 A | 4/1986 | Savit | |
| 4,616,348 A | 10/1986 | Ostrander | |
| 4,616,590 A | 10/1986 | Albertini et al. | |
| 4,621,347 A | 11/1986 | Ostrander | |
| 4,648,083 A | 3/1987 | Giallorenzi | |
| 4,669,067 A | 5/1987 | Roberts | |
| 4,719,987 A | 1/1988 | George, Jr. et al. | |
| 4,729,333 A | 3/1988 | Kirby et al. | |
| 4,756,268 A | 7/1988 | Gjestrum et al. | |
| 4,775,028 A | 10/1988 | de Heering | |
| 4,798,156 A | 1/1989 | Langeland et al. | |
| 4,800,831 A | 1/1989 | Hellmann et al. | |
| 4,870,626 A | 9/1989 | Tveit | |
| 4,992,991 A | 2/1991 | Young et al. | |
| 4,998,227 A | 3/1991 | Rygg et al. | |
| 5,046,055 A | 9/1991 | Ruffa | |
| 5,097,788 A | 3/1992 | Castel | |
| 5,113,376 A | 5/1992 | Bjerkoy | |
| 5,142,505 A | 8/1992 | Peynaud | |
| 5,144,588 A | 9/1992 | Johnston et al. | |
| 5,157,636 A | 10/1992 | Bjerkoy | |
| 5,263,431 A | 11/1993 | Wood | |
| 5,305,703 A | 4/1994 | Korsgaard | |
| 5,353,223 A | 10/1994 | Norton et al. | |
| 5,408,441 A | 4/1995 | Barr et al. | |
| 5,532,975 A | 7/1996 | Elholm | |
| 5,666,900 A | 9/1997 | Carroll et al. | |
| 5,676,083 A | 10/1997 | Korsgaard | |
| 5,841,733 A | 11/1998 | Bouyoucos et al. | |
| 5,941,746 A | 8/1999 | Isnard et al. | |
| 6,012,406 A | 1/2000 | Dudley et al. | |
| 6,021,577 A | 2/2000 | Shiells et al. | |
| 6,046,959 A | 4/2000 | Salmi et al. | |
| 6,058,072 A | 5/2000 | Abraham | |
| 6,088,296 A | 7/2000 | Seaman et al. | |
| 6,189,477 B1 | 2/2001 | Cody | |
| 6,212,476 B1 | 4/2001 | Noy et al. | |
| 6,227,310 B1 | 5/2001 | Jamieson | |
| 6,467,423 B1 | 10/2002 | Poldervaart | |
| 6,474,254 B1 | 11/2002 | Ambs et al. | |
| 6,487,782 B1 | 12/2002 | Bond | |
| 6,493,636 B1 | 12/2002 | DeKok | |
| 6,504,792 B2 | 1/2003 | Barker | |
| 6,525,992 B1 | 2/2003 | Olivier et al. | |
| 6,532,189 B2 | 3/2003 | Barker | |
| 6,606,958 B1 | 8/2003 | Bouyoucos | |
| 6,683,819 B1 | 1/2004 | Estaphan et al. | |
| 6,823,262 B2 | 11/2004 | Bahorich et al. | |
| 7,042,803 B2 | 5/2006 | Kutty et al. | |
| 7,092,315 B2 | 8/2006 | Olivier | |
| 7,190,634 B2 | 3/2007 | Lambert et al. | |
| 7,206,254 B2 | 4/2007 | Oliver et al. | |
| 7,206,256 B1 | 4/2007 | Thornton et al. | |
| 7,209,408 B1 | 4/2007 | Stottlemyer et al. | |
| 7,221,623 B2 | 5/2007 | Thornton et al. | |
| 7,222,579 B2 | 5/2007 | Hillesund et al. | |
| 7,252,046 B1 | 8/2007 | Ead et al. | |
| 7,293,520 B2 | 11/2007 | Hillesund et al. | |
| 7,376,515 B2 | 5/2008 | Smith | |
| 7,423,929 B1 | 9/2008 | Olivier | |
| 7,457,193 B2 | 11/2008 | Pramik | |
| 7,623,411 B2 | 11/2009 | Faucheaux et al. | |
| 7,660,189 B2 | 2/2010 | Vigen et al. | |
| 8,347,801 B2 | 1/2013 | Denise | |
| 8,582,394 B2 | 11/2013 | Suedow et al. | |
| 2005/0180263 A1 | 8/2005 | Lambert et al. | |
| 2006/0239122 A1 | 10/2006 | Vigen et al. | |
| 2006/0256653 A1 | 11/2006 | Toennessen et al. | |
| 2006/0262647 A1 | 11/2006 | Thornton et al. | |
| 2007/0070808 A1 | 3/2007 | Ray et al. | |
| 2008/0141916 A1 | 6/2008 | Bein | |
| 2008/0163504 A1 | 7/2008 | Smith et al. | |
| 2008/0223583 A1 | 9/2008 | Roveri et al. | |
| 2009/0141587 A1 | 6/2009 | Welker et al. | |
| 2009/0141591 A1 | 6/2009 | Basilico | |
| 2009/0161485 A1 | 6/2009 | Toennessen et al. | |
| 2009/0262601 A1 | 10/2009 | Hillesund et al. | |
| 2009/0265111 A1 | 10/2009 | Helwig et al. | |
| 2009/0296519 A1 | 12/2009 | Keers et al. | |
| 2009/0316526 A1 | 12/2009 | Grall | |
| 2010/0226204 A1 | 9/2010 | Gagliardi et al. | |
| 2010/0312519 A1 | 12/2010 | Huang et al. | |
| 2011/0013481 A1 | 1/2011 | Clark | |
| 2012/0134234 A1 | 5/2012 | Roberts et al. | |
| 2013/0182531 A1 | 7/2013 | Gagliardi et al. | |
| 2014/0102347 A1 | 4/2014 | Gagliardi et al. | |
| 2014/0104985 A1 | 4/2014 | Gagliardi et al. | |
| 2014/0153360 A1 | 6/2014 | Tonchia | |

OTHER PUBLICATIONS

International Search Report and Written Opinion in PCT/US2010/026617, dated May 4, 2010.

European Search Report from counterpart EP Appl. No. 12168832.9, dated May 3, 2013.

(56) References Cited

OTHER PUBLICATIONS

International Search Report from counterpart PCT Appl. No. PCT/US2012/036739, dated May 3, 2013.
Extended European Search Report from counterpart EP Appl. No. 12168832.9, dated Oct. 22, 2013.
PESA News, "Extending the Range and Geographical Applicability of the Q-Marine Solution," by Tim Bunting, Western Geo, dated Apr./May 2009, 2 pages.
MacArtney A/S—Worldwide Underwater Technology, "ROTV Remote Towed Vehicles," obtained from http://www.macartney.com, generated on Nov. 12, 2009.
"Impacts of Marine Acoustic Technology on the Antarctic Environment," version 1.2, dated Jul. 2002, SCAR Ad Hoc Group on Marine Acoustic Technology and the Environment, 62 pgs.
ION Marine Imaging Systems—Optimizing 4D Repeatability with Enhanced Acquisition Technologies, by Mike Burnham, 4pgs., (c) 2007.
Jokat, W. et al. "Marine Seismic Profiling in Ice Covered Regions," Polarforschung 64 (1): 9-17, 1994.
Terra Antarctica, "A Novel Over-Sea-Ice Seismic Reflection Survey in McMurdo Sound, Antarctica," by S. J. Betterly, Montana Tech of the University of Montana, dated Sep. 18, 2007.
ION Marine Imaging Systems, "Model 5011 Compass Bird, Performance Data," (c) 2007.
ION Marine Imaging Systems, "Model 5010 DigiBIRD, Performance Data," (c) 2007.
ION Marine Imaging Systems, DigiFIN, Performance Data (c) 2008.

"HNB Ice Period Buoy Manufacturer Exporting Direct from Hebei China," obtained from http://buoy.en.alibaba.com, generated on Sep. 25, 2009.
Ice Spar Buoy, Rotonics Mfg. Inc., http://www.rotonics.com, 2807 Stephen F. Austin Drive, Brownwood, TX 76801, dated Jun. 3, 2003.
Intelligent Acquisition—"Streamer Steering Case Study," obtained from http://www.iongeo.com, generated on Nov. 10, 2009.
Fugro News, "Fugro Announces Purchase of FOCUS-2 ROTV Systems," dated Nov. 16, 2005, obtained from http://www.fugro.com, generated on Nov. 21, 2009.
"ORCA—Instrument Room Control System," obtained from http://www.iongeo.com, generated on Nov. 10, 2009.
ION Geophysical, "DigiFIN:Streamer Steering," obtained from http://www.iongeo.com, generated on Nov. 10, 2009.
"Slocum Glider: Design and 1991 Field Trials," prepared by Paul Simonetti, Webb Research Corp., under subcontract from Woods Hole Oceanographic Instituition, Office of Naval Technology, Contract No. N00014-90C-0098, dated Sep. 1992.
"Triaxus Towed Undulator," MacArtney Underwater Technology Group, dated Oct. 1, 2005.
Official Action in counterpart Russian Appl. No. 2011140864, dated Apr. 29, 2012.
Translation of Official Action in counterpart Russian Appl. No. 2011140864.
Pending Claims in n counterpart Russian Appl. No. 2011140864.
Technical and Search Report in counterpart Danish Appl. No. PA201270271, dated Dec. 6, 2012.
Int'l Search Report and Written Opinion in PCT Appl. PCT/US2015/041954, dated Jan. 12, 2016.

\* cited by examiner

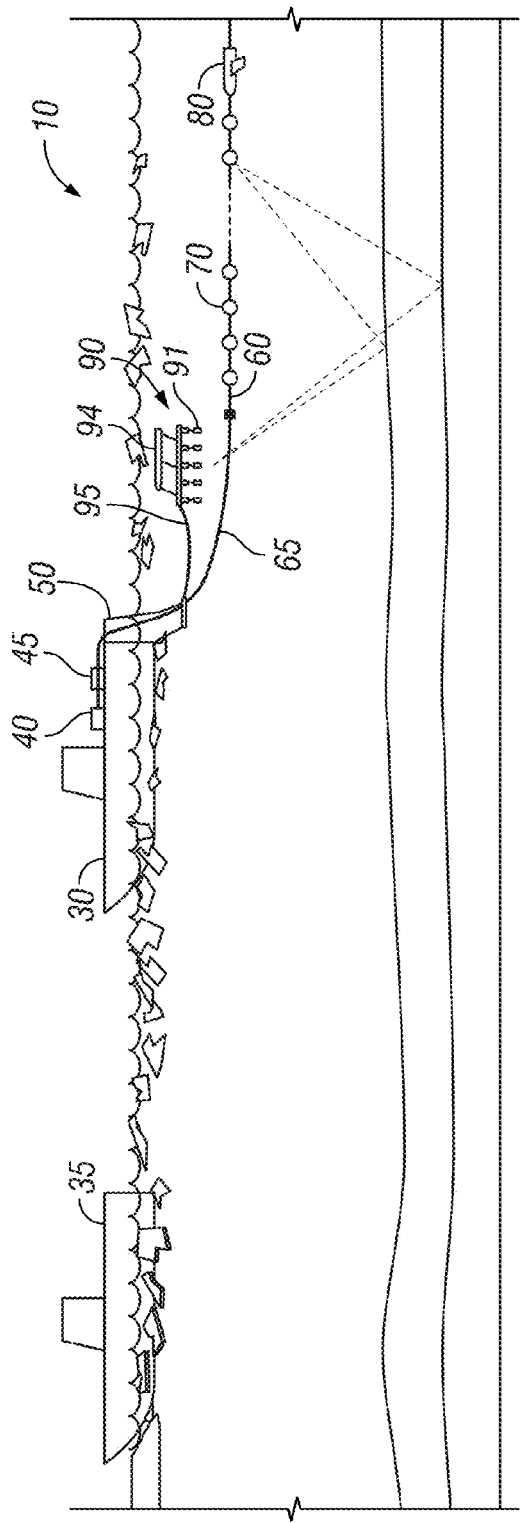
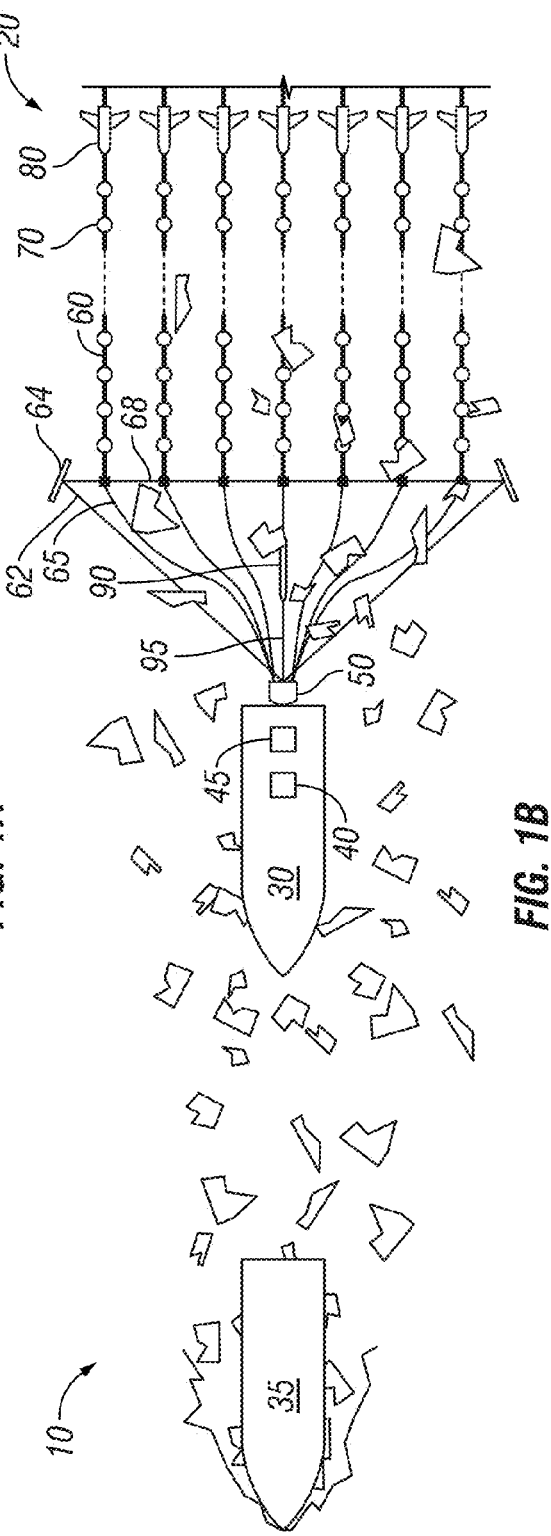
FIG. 1A
FIG. 1B

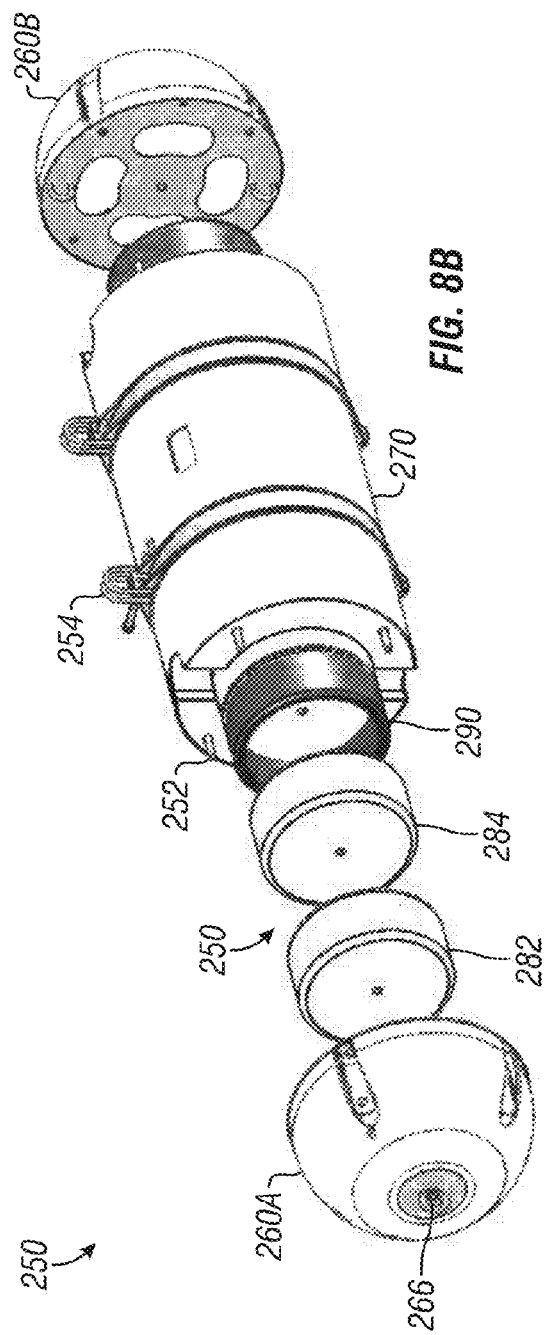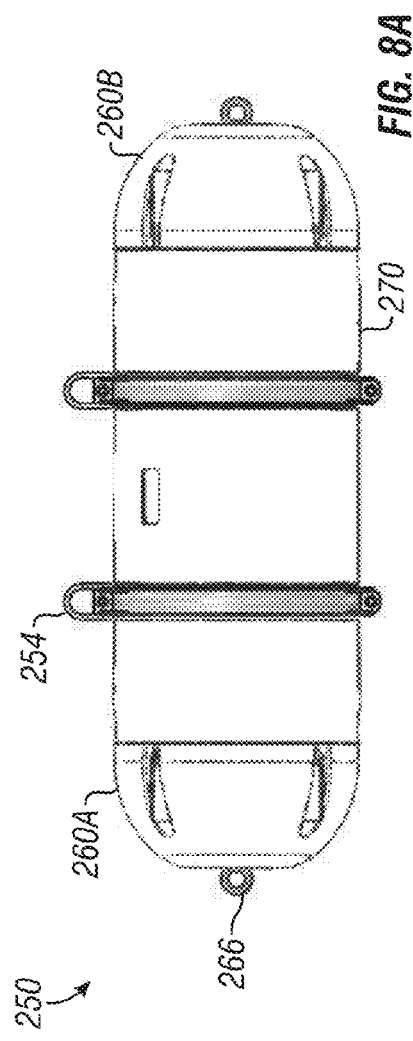

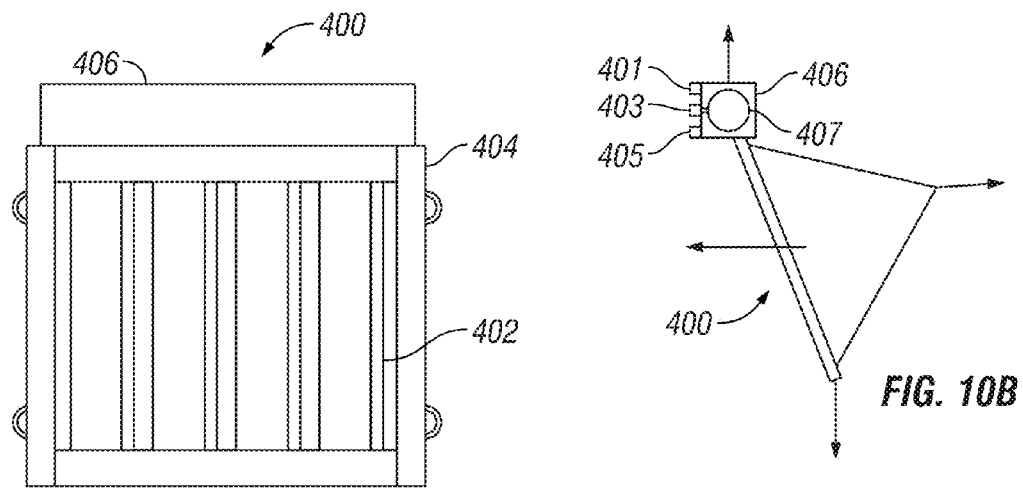
FIG. 10A
FIG. 10B
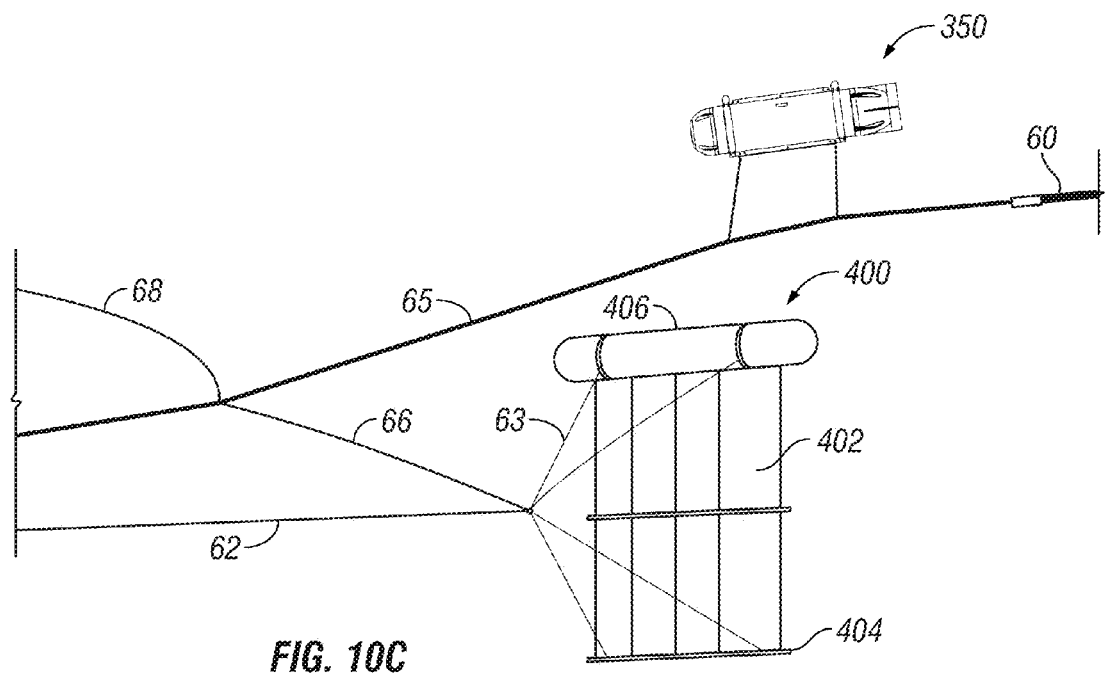
FIG. 10C

MARINE SEISMIC SURVEYING WITH TOWED COMPONENTS BELOW WATER'S SURFACE

CROSS-REFERENCE TO RELATED APPLICATIONS

This is a continuation-in-part of U.S. application Ser. No. 13/793,544, filed 11 Mar. 2013, which is a continuation-in-part of U.S. application Ser. No. 12/719,783, filed 8 Mar. 2010, which is a non-provisional of U.S. Prov. Appl. Nos. 61/158,698, filed 9 Mar. 2009; 61/246,367, filed 28 Sep. 2009; and 61/261,329, filed 14 Nov. 2009, which are all incorporated herein by reference in their entireties. Additionally, this application is filed concurrently with U.S. application Ser. No. 14/339,726, entitled "Marine Seismic Surveying with Towed Components Below Water's Surface," which is incorporated herein by reference in its entirety.

BACKGROUND

Conventional marine seismic surveying uses a seismic source and a number of streamers towed behind a seismic survey vessel. These streamers have sensors that detect seismic energy for imaging the formations under the seafloor. Deploying the streamers and sources and towing them during a survey can be relatively straightforward when operating in open waters with moderate swells or the like.

Marine locations covered by ice, debris, large swells, or other obstacles can make surveying more difficult, expensive, or even impossible. In icy waters, for example, the seismic survey vessel must break through ice and traverse waters filled with ice floes. The noise generated by ice impacts can complicate the seismic record produced.

Additionally, the ice floes on the water's surface make towing the source and streamers more difficult and prone to damage. For example, any components of the system at the water's surface can encounter ice, become bogged down, and lost. In addition, any cables or towlines coming off the vessel even from slipways can collect ice at the surface. Likewise, ice pulled under the hull and rising behind the vessel can shear away these cables and lines.

Some approaches for performing seismic surveys in icy regions known in the art are disclosed in U.S. Pat. Nos. 5,113,376 and 5,157,636 to Bjerkoy. To date, however, the problems associated with marine seismic surveying in icy or obstructed waters have not been significantly addressed.

The subject matter of the present disclosure is directed to overcoming, or at least reducing the effects of, one or more of the problems set forth above.

SUMMARY OF THE DISCLOSURE

In embodiments disclosed herein, a marine surveying apparatus for a vessel has towed components for obtaining seismic data. The towed components towed by the vessel are submerged at a first level below the surface of the water.

In particular embodiments of the apparatus, the towed components can include a 3D spread of seismic streamers and source(s) that are neutrally buoyant to be towed below the surface of the water during survey operations. For example, the towed components can include a float submerged below the surface of the water and supporting the at least one towed component. The float has preconfigured buoyancy so that the towed component can be towed at the desired depth under the water's surface. To configure the buoyancy for the characteristics of the implementation (e.g., tow speed, depth, weight of component, etc.), the float can use buoyant inserts and neutral spacers disposed in a hollow of the float to configuring the buoyancy of the float.

The towed components can include a streamer towed by the vessel and supported by the float. Such a streamer typically has one or more sensors for sensing a seismic signal. The towed component can also include a paravane towed by the vessel and supported by the float. The paravane is typically coupled to one or more additional towed components.

In particular embodiments disclosed herein, a marine surveying vessel is used for towing the towed components of the seismic equipment with one or more cable or lines. The vessel has one or more skegs mounted on the vessel and extending at least below a waterline of the vessel. For example, the skeg can mount on a stern of the vessel, and a distal end of the skeg can extend below the stern to at least a keel of the vessel.

The skeg has one or more shuttles movable along the skeg, and each of the one or more shuttles in turn has one or more tow points disposed on the shuttle and movable along the skeg therewith. The one or more tow points support the one or more cables for towing the seismic equipment behind the vessel and below the water's surface.

To guide the shuttle, the skeg can have a rail extending along the skeg, and pulleys can move the shuttle along the first skeg. In addition to having shuttles, the skeg defines a passage extending at least below the waterline of the vessel. The passage protects the one or more cables of the seismic equipment passing from the vessel to below the waterline.

In embodiments disclosed herein, the marine surveying apparatus for the vessel having towed components for obtaining seismic data uses positioning to determine relative locations of the components submerged below the surface of the water. In particular, at least one first transceiver disposed at the vessel emits a first signal and detects first location information of the towed components with the first signal. At least one second transceiver towed from the vessel is submerged at a second level below the surface of the water. The second transceiver emits a second signal and detects second location information of the towed components with the second signal. For example, this second transceiver can be disposed on a deployed device towed behind the vessel at a deeper depth than the various towed components.

Various devices can be used for the transceivers to detect the location information. For example, the transceivers can be acoustic transceivers and can emit signals, such as acoustic positioning signals, ultra short base line signals, short base line signals, and long base line signals.

In addition to the first and second transceivers, the apparatus can use cross-bracing equipment disposed along the streamers towed in a spread behind the vessel. While the streamers obtain the seismic data, the cross-bracing equipment emits a third signal and detects third location information of the streamers with the third signal.

The location information obtained can include distances (and bearings) of the towed components from the transceivers. In the end, a processor can process the location information and can produce output locations of the towed components for association with the seismic data obtained. The resolution of these output locations can be refined because the location information is obtained from two different aspects (i.e., the different depths and perspectives of the first and second transceivers).

The towed components can include a seismic source having at least one transponder responding to the first signal. In this instance, the at least one first transceiver disposed at the vessel can include one transceiver disposed on the vessel and another transceiver disposed on the source. The vessel's transceiver is paired with a transponder of the seismic source, while the source's transceiver emits a signal to additional ones of the towed components towed behind the source to determine their relative location.

In a method of marine seismic surveying disclosed herein, a vessel tows a plurality of towed components submerged at a first level below the surface of the water so the towed components can obtain seismic data. First location information of the towed components is detected with a first signal emitted by at least one first transceiver disposed at the vessel. Additionally, second location information of the towed components is detected with a second signal emitted by at least one second transceiver towed behind the vessel and submerged at a second level below the surface of the water.

When detecting the location information, at least distances (and bearings) of the towed components from the transceivers can be obtained. For additional information, cross-bracing equipment can be used on the streamers of the towed components and can detect third location information of the streamers with cross-bracing signals between the streamers.

In the end, locations of the towed components can be rectified by processing the various pieces of location information. In turn, the rectified locations can be associated with the seismic data obtained to improve the resolution of the seismic survey.

In a method disclosed herein, a seismic spread is constructed having an arrangement of towed components to be neutrally buoyant in water when towed in a seismic survey. The towed components at least including streamers and paravanes. The method involves determining immersed weight and drag of the towed components and calculating drag forces versus buoyancy required to neutrally buoy the towed components at at least one tow speed based on the determined weight and drag of the towed components.

Floatation for the seismic spread is configured based on the calculated drag forces versus buoyancy. For example, configuring the floatation for the seismic spread can involve configuring first floats for the streamers of the seismic spread and/or second floats for the paravanes of the seismic spread. As an option, floatation can also be configured for a seismic source towed in the seismic survey.

Trim forces required to maintain the streamers of the seismic spread having the configured floatation at at least one desired depth in the water are calculated in relation to one or more deviating variables of the seismic survey. For example, the deviating variables can include a change in desired tow speed, a course change, an environmental condition, water salinity, water temperature, and ocean current.

Active surfaces for controlling the seismic spread are configured based on the calculated trim forces. For example, one or more controllable foils can be selected for installation on one or more of the streamers. The arrangement of the towed components in the seismic spread is constructed with the configured floatation and the configured active surfaces.

Because the configured floatation can alter variables in the analysis, the method preferably involves, after configuring the floatation, determining drag for the configured floatation and recalculating the drag forces versus buoyancy required to neutrally buoy the towed components at the at least one tow speed based on the determined weight and drag of the towed components and the determined drag for the configured floatation.

Because the configured floatation may need to be adjusted in the field or to fit particulars of an implementation, the method preferably involves configuring the floatation with a range of adjustable buoyancy. The range of adjustable buoyancy can be determined to meet or not meet a tolerance, in which case additional floatation is configured for the seismic spread.

The foregoing summary is not intended to summarize each potential embodiment or every aspect of the present disclosure.

BRIEF DESCRIPTION OF THE DRAWINGS

FIGS. 1A-1B show side and plan views of a marine seismic survey system according to certain teachings of the present disclosure.

FIGS. 8A-8D illustrate side, exploded, and two cross-sectional views of an adjustable buoyancy float of the floatation components in FIG. 7.

FIGS. 10A-10C show buoyant paravanes according to the present disclosure for the disclosed marine seismic survey system.

DETAILED DESCRIPTION

A. Marine Seismic Survey System

Figure 2A:
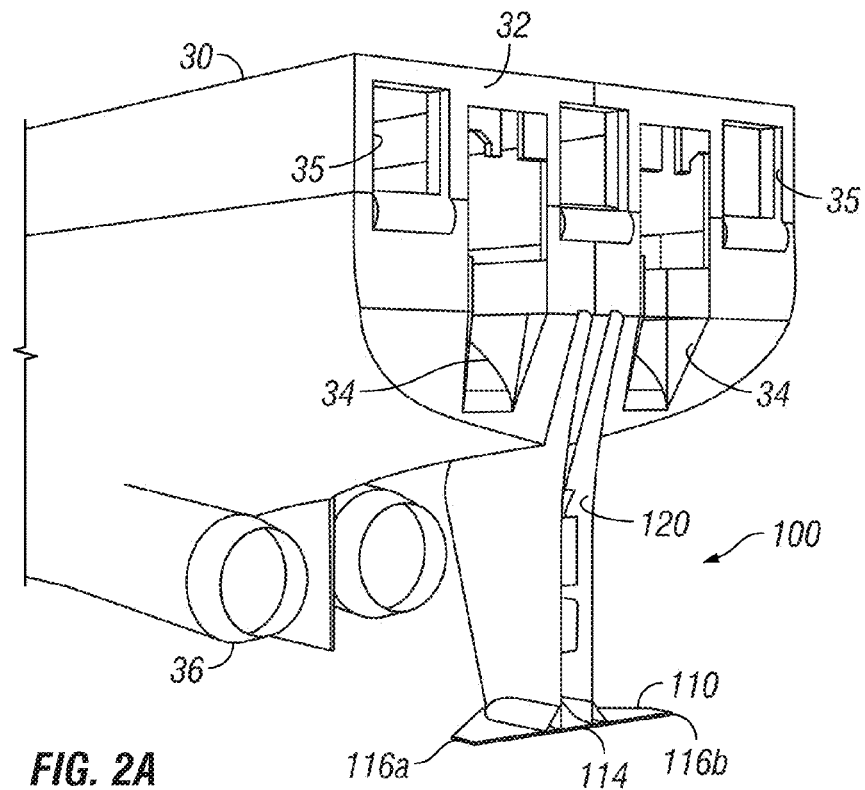
FIGS. 2A-2D show an aft view of a vessel having different embodiments of skegs for towing an array of seismic streamers and a source of the disclosed marine seismic survey system.

A marine seismic survey system 10 in FIGS. 1A-1B can be used in icy regions having glacial ice, pack ice, and ice floes. However, elements of the system 10 can be used in other locations having debris, plants, flotsam, jetsam, or other obstructions or obstacles at the water's surface that can interfere with towed components of the marine seismic survey system. In fact, this system 10 and others disclosed herein can be used in any environment—not just those prone to physical obstructions or obstacles, such as ice. For example, weather, large swells, noise, conventional hazards, and even normal conditions encountered in marine seismic surveys can benefit from the systems of the present disclosure. Accordingly, reference to icy or obstructed waters in the present disclosure is meant to be illustrative.

In icy regions, for example, the system 10 preferably includes an icebreaker vessel 35 that breaks ice in advance of a tow vessel 30. In operation, the icebreaker vessel 35 breaks pack ice and diverts ice floes to create a tract for passage of the tow vessel 30. As the tow vessel 30 tows one or more streamers 60, a supply system 45 operates a source 90, and a control system 40 having a seismic recorder that records the seismic data obtained with sensors 70 on the streamers 60.

Because the tow vessel 30 operates in icy or obstructed waters or even when the tow vessel 30 operates under normal conditions in typical waters, a protective device 50 on the tow vessel 30 couples to towlines 62 and couples to the lead-in cables 65 and umbilical cables 95 that support the streamers 60 and sources 90. (Although multiple streamers 60 are shown, the system 10 can have one steamer 60 if desired). As discussed below, the protective device 50 (referred to herein as a skeg) keeps towlines and cables for the towed components away from the water's surface, which can have ice floes for icy regions, other obstacles in other regions, or the like, for example. The skeg 50 allows the vessel 30 to tow the streamers 60 while handling various loads caused by motions of the vessel 30, forces from the towed bodies, and interactions with the possible ice, waves, or other impediments.

In general, the skeg 50 can be located anywhere on the vessel 30. As best shown in FIG. 1A, however, the skeg 50 preferably extends from the vessel's hull at the stern. This abaft position is better suited for deploying cables, towlines, and other components of the marine seismic survey system being towed by the vessel 30. In one arrangement, the skeg 50 is a static addition to the vessel 30 that can be welded, incorporated, or otherwise attached in a shipyard to an existing design of a vessel's hull. Alternatively, the vessel 30 can be predesigned and built with an appropriate skeg 50 incorporated into its hull design, or the skeg 50 may be a deployable component provided with appropriate mechanisms for deploying and holding it on the vessel 30. In yet another arrangement, the skeg 50 can be a portable or independent component that can be mounted temporarily on the side of the vessel without the need for modifying the vessel's hull.

Extending below the vessel's waterline, the skeg 50 keeps the attachment points for towlines (e.g., 62), lead-in cables 65, umbilical cables 95, etc. below the surface of the water. This keeps the towlines 62 and cables 65, 95 below the water's surface and away from any issues (e.g., any ice floes floating on the water's surface that could interfere with or collect around the towlines 62, lead-in cables 65, umbilical cables 95, etc.). The lead-in cables 65 connected to the seismic recorder of the control system 40 extend from the vessel 30, and the skeg 50 directs these streamer lead-in cables 65 below the water's surface (e.g., so that ice will not interfere with or collect around them). For icy or obstructed regions, the depth required to effectively hold the streamer lead-in cables 65 and the connected streamers 60 below any ice level can be depend on the particular implementation. As one example, the skeg 50 may extend about 7-m below the vessel 30's waterline. However, this distance can vary for a given implementation, depending on the type of ice regime in which the vessel is operating, the size of the vessel, and other factors.

In the present arrangement, a seismic source 90 suspends horizontally in the water column behind the vessel 30 and has a plurality of seismic source elements 91, which are typically air guns. (Although one source 90 is shown, the system 10 can use multiple sources.) A supply or umbilical cable 95 connected to the supply system 45 extends from the vessel 30, and the skeg 50 also directs this umbilical cable 95 below the water's surface so it is out of the way of ice, obstacles, waves, swells, and the like as well. A towline (not shown) may connect the umbilical cable 95 to the skeg 50 to help tow the source 90 behind the vessel 30.

The umbilical cable 95 is preferably neutrally buoyant, and the source 90 can be stabilized by one or more flotation devices or buoys 94. For icy regions, because ice moves along the surface of the water, the flotation device 94 can be designed to handle interactions with ice as it floats at the surface. Accordingly, the flotation device 94 can be shaped to minimize impacts with ice or other obstacles and can be arranged horizontally to cut through any ice floes or obstructions at the surface. Preferably, however, the flotation device 94 is designed to avoid contact with ice or other obstacles by floating below the surface, as discussed in more detail later.

To tow the horizontal source 90 behind the vessel 30, a towline (not shown) may be used to secure to the skeg 50 under the water and to connect to the source 90 suspended below the water's surface. One or more support lines interconnect the flotation device 94 with the source 90. The umbilical cable 95 extends off the end of the vessel 30, fits through a channel in the skeg 50, and connects to the source 90 for operation.

In general, the towlines 62, streamers 60, sensors 70, cables 65/95, control system 40, and supply system 45 can be conventional components known and used in marine seismic surveying. For example, the source elements 91 can be operated in any conventional manner to create a suitable seismic source signal. In addition, the streamers 60 can use neutrally buoyant cables used for supporting appropriate marine seismic sensors 70. As such, each streamer 60 can have several sections with each having an outer skin to protect the interior from water and having axial members along its length for axial strength. Each section of the streamer 60 can also have a wire bundle that carries electrical power and data communication wires. For their part, the sensors 70 are typically hydrophones located within the streamer 60.

As further shown in FIG. 1B, paravanes, fins, or doors 64 and spreader ropes 68 can be used to support multiple streamers 60 in a 3-D spread 20 behind the tow vessel 30. These paravanes 64 and spreader ropes 68 can also be similar to conventional components used for marine seismic surveying, except that the paravanes 64 preferably tow under the water's surface as discussed later. Finally, the streamers 60 can include control devices 80 disposed thereon—i.e., along their length and/or at their distal ends. These control devices 80 can include tail drogues, birds, vanes, controllable vehicles, and the like as disclosed herein and in the incorporated parent applications.

Because the towing vessel 30 tows the seismic spread 20 in icy or obstructed waters, deployment of the seismic survey components preferably accounts for possible issues with ice floes and the like that can hinder the deployment and retrieval of the streamers 60 and sources 90. Deployment and retrieval of the system may be performed when the towing vessel 30 is away from significant ice. For example, the seismic system can be deployed normally before putting cables into the skeg 100 and submerging the various components.

In a typical implementation, the streamers 60 can be several kilometers in length, and deploying the seismic system in a clearing may require a significant area that may not always be available in icy regions. Therefore, it is desirable to be able to deploy/retrieve the disclosed seismic systems in other areas of an icy region, including those having ice.

The vessel 30 may break the ice and/or push ice floes out of the way as it travels so that a narrow deployment area lies in its wake where ice may be relatively absent. Of course, this depends on how tightly the ice is packed and how it might be traveling. When conditions permit, it is preferred to be able to deploy and retrieve the streamers 60 of an array in such a cleared area. Therefore, the deployment and retrieval techniques for surveying in icy waters preferably take advantage of this potentially cleared area. The examples below discuss several forms of seismic arrays that can be deployed and retrieved in such an area.

In FIG. 1B, the seismic array or spread 20 uses towlines and streamer lead-in cables 65 connected from the skeg 50 on the vessel 30 to head floats 350. Spreader ropes 68 connect across the head floats 350, and tow lines 62 are deployed with paravanes 64 on the end.

Although one skeg 50 is shown in the arrangements of FIG. 1B, it is possible for the vessel 30 to use multiple skegs 50 on the vessel 30 to deploy the streamers 60. Using the multiple skegs 50 can help in the deployment and retrieval of the streamers 60 by dividing them up in their arrangement. Although the arrangements in FIGS. 1A-1B and elsewhere show a single source, multiple sources could be used. Moreover, one source can be towed in a conventional location behind the vessel 30, while another source can towed behind the splayed array of the steamers 60. This second source can be used to obtain a reverse reading from the steamers 60, which can be advantageous for data acquisition and analysis.

During marine seismic surveying, it is desirable to determine, track, and potentially control the positions of the streamers 60 and the source 90 to better acquire and map the seismic data obtained. Determining position can be done using GPS readings of the streamers 60 during the survey. This can be done in some cases, but in other cases obtaining GPS readings for the locations of the streamers 60 may not be feasible.

In the marine seismic surface systems 10 of the present disclosure, for example, obtaining GPS readings can prove difficult because the system 10 is significantly submerged below the water's surface so that GPS receivers cannot operate to obtain readings. Several types of deployed or controllable device 80 can be used on the streamers to obtain GPS readings and otherwise control the position of the streamers during surveying. These are disclosed in the incorporated patent applications. In other techniques, the seismic survey can be conducted in an open traverse without obtaining GPS readings of the streamers 60. These techniques are also disclosed in the incorporated applications. The details related to both of these techniques are not repeated herein for the purposes of brevity.

With an understanding of the disclosed system 10, discussion now turns to particular components of the system, starting with the skeg.

B. Skeg Designs

As discussed above, the tow vessel 30 uses the skeg 50 to keep the towlines 62 and cables 65/95 below the water's surface (e.g., away from ice floes or the like). As shown in FIG. 2A, one embodiment of a skeg 100 mounts onto the aft or stern 32 of the seismic tow vessel 30 used to tow seismic streamers (not shown). As noted previously, the skeg 100 can mount anywhere on the vessel 30, including the port, starboard, bow, or through a moon pool in the hull. However, the stern or aft 32 of the vessel 30 is preferred because the steamers (not shown) are best towed behind the vessel 30, which can help break waves, ice floes, or the like while towing the streamers.

In this embodiment, the skeg 100 is a single conduit extending from the aft 32 of the vessel 30. So as not to interfere significantly with the vessel's steering and other functions, this single conduit skeg 100 is preferably used on a vessel 30 having dual screws 36, although it could be used with other types of vessels. The skeg 100 extends under the hull between slipways 34 used for deploying and retrieving steamers and cables. Along its after or trailing edge, the skeg 100 defines an open passage or channel 120 for passage of steamer cables, source cables, and slack lines as discussed later.

Even though the skeg 100 extends off the aft 32, ice may be forced to flow along the bottom of the vessel's hull when surveying in icy waters. This forced ice eventually reaches the aft 32 of the vessel 30 where it again resurfaces. In other situations, ice impacted by the bow of the vessel 30 may be forced under the vessel's hull and then attempt to resurface toward its aft 32 as the vessel 30 travels forward. In any event, the skeg 100 acts as a protective conduit to keep the towlines, cables, and the like away from this ice.

At its distal end, the skeg 100 may have a base or plate 110 that provides attachment points 114/116a-b for the towlines. In this way, the skeg 100 provides tow points 114/116a-b below the water's surface (and away from the ice floes at the surface). In addition to remaining protected, these undersurface tow points 114/116a-b also help maintain the streamers and source below the surface.

Figure 2B:
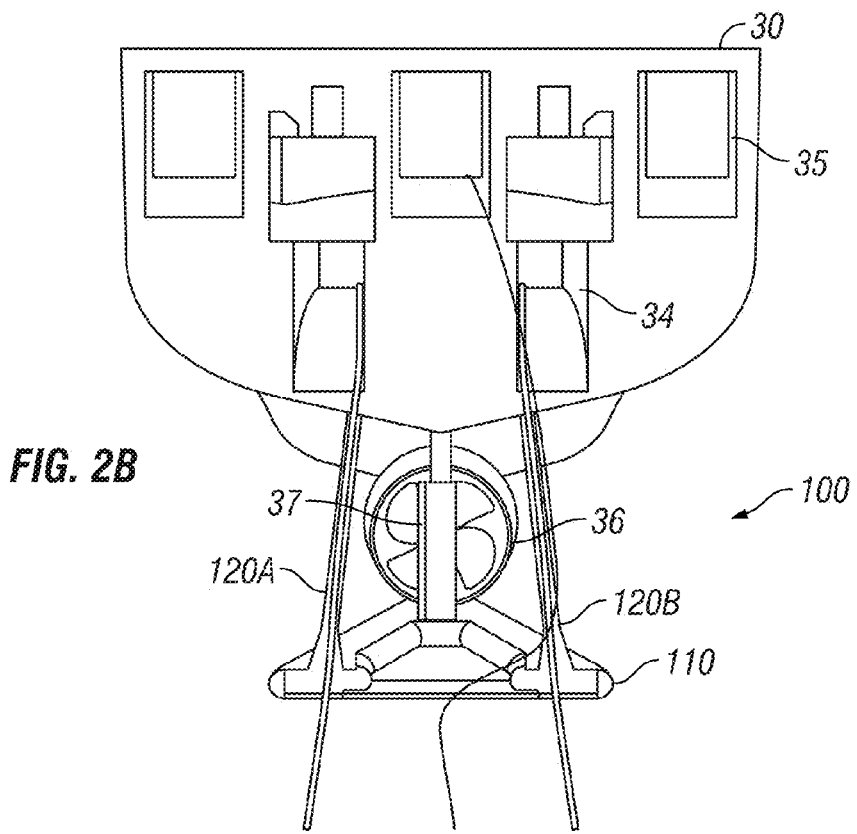

The previously described skeg 100 provides a single conduit down the center of the vessel's aft 32, which may be best suited for a vessel 30 with dual screws 36. As an alternative, a skeg 100 in FIG. 2B provides two or more conduits or passages 120 down a vessel's aft 32 and can be used with a vessel 30 having one or two screws 36 and one or two rudders 37.

The dual channels 120A-B pass from the aft 32 of the vessel 30 and under the surface of the water on either side of the vessel's screw 36. In this way, the wake of the screw 36 and the rudder 34 of the vessel 30 can remain relatively unobstructed in the open space between the channels 120A-B.

The base plate 110 at its front end connects to the keel of the vessel 30. As with previous designs, the base plate 110 has tow points for attachment of towlines used to support the streamers and source of the seismic system. For example, these tow points can lie along the tailing edge of the plate 110. In addition, attachment points for the cables in the channels 120A-B are also provided on the trailing edge of the plate 110.

Figure 2C:
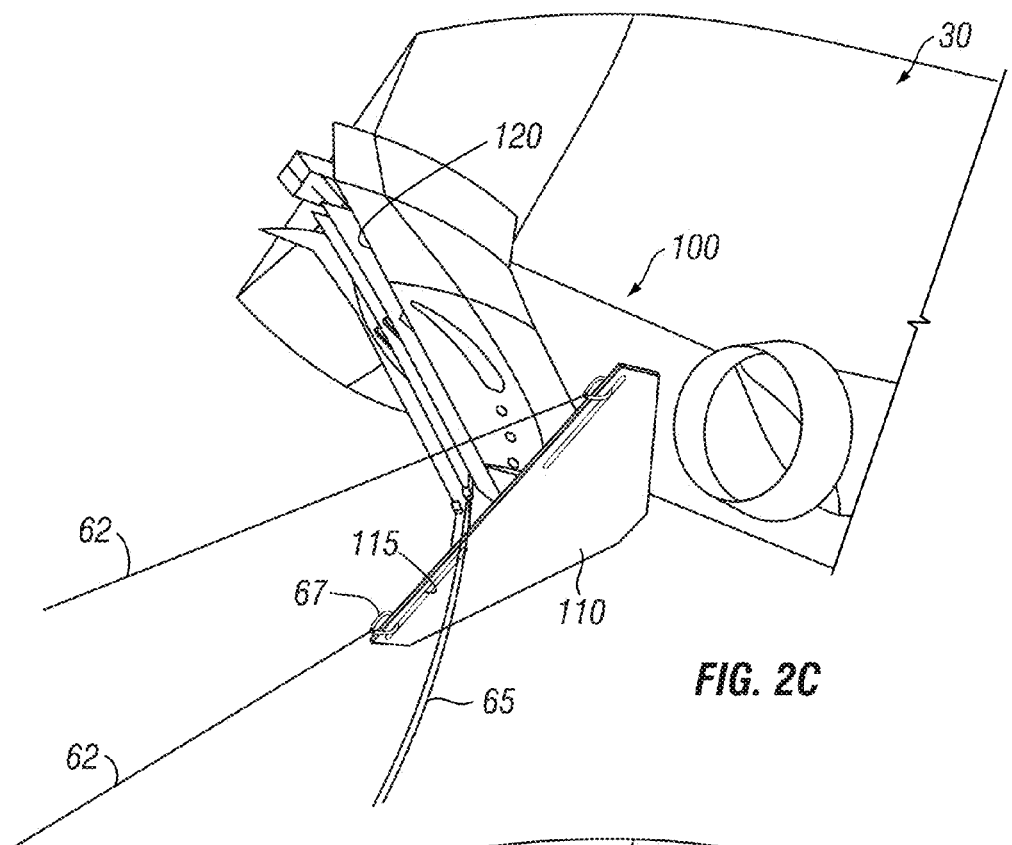
Figure 2D:
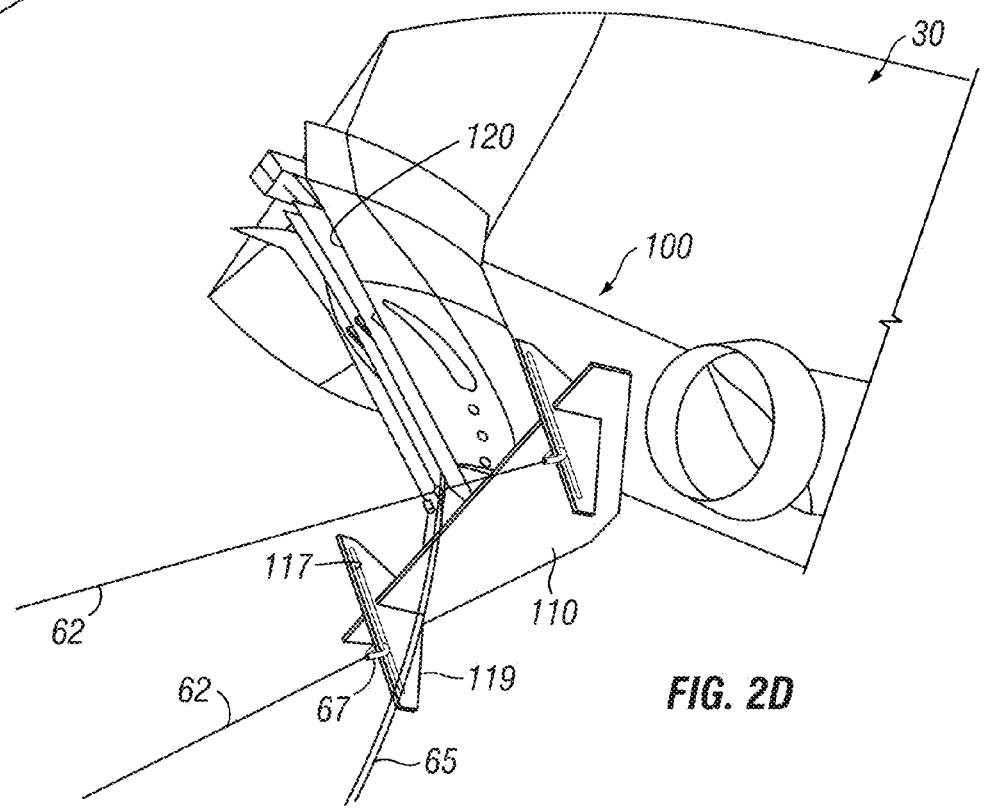

In previous examples, the skeg has tow points that are fixed. As an alternative, FIGS. 2C-2D show arrangements for a skeg 100 having adjustable tow points for the connection of tow lines. In FIG. 2C, the skeg's base 110 has slots or coupling points 115 that allow coupling members 67 on the end of tow lines 62 to be adjusted or to automatically adjust horizontally on the base 110. In FIG. 2D, the skeg's base 110 has slots or coupling points 117 on fins or turrets 119 that allow coupling members 67 on the end of the tow lines 62 to be adjusted or to automatically adjust vertically on the base 110.

As shown, the slots or coupling points 115 and 117 can allow the coupling members 67 to ride freely therein for automatic adjustment. The actual position of the two lines 62 can be adjusted elsewhere in the system using any of the various devices disclosed herein. Rather than being elongated, the slots or coupling points 115 and 117 can have a number of preconfigured set positions for pre-adjustment of the tow lines 62. Moreover, both vertical and horizontal adjustment of the two points on the skeg 100 can be achieved by combining the features of both FIGS. 2C-2D. As such, the vertical fin or turret 119 with the vertical slot or coupling point 117 can ride or affix in a horizontal slot or coupling point 115 on the base 110. In combination then, the two points for the tow lines 62 can be adjusted both vertically and horizontally.

Figure 3A:
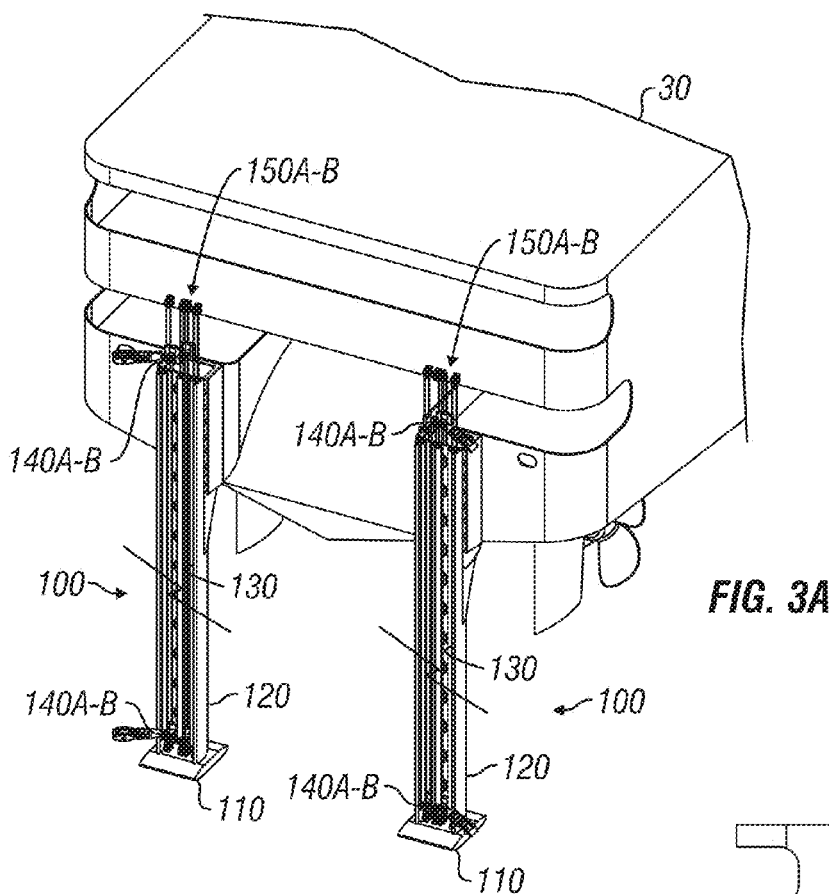
FIGS. 3A-3B show a stern of a vessel having another embodiment of a skeg with movable shuttles for adjusting tow points.
Figure 3B:
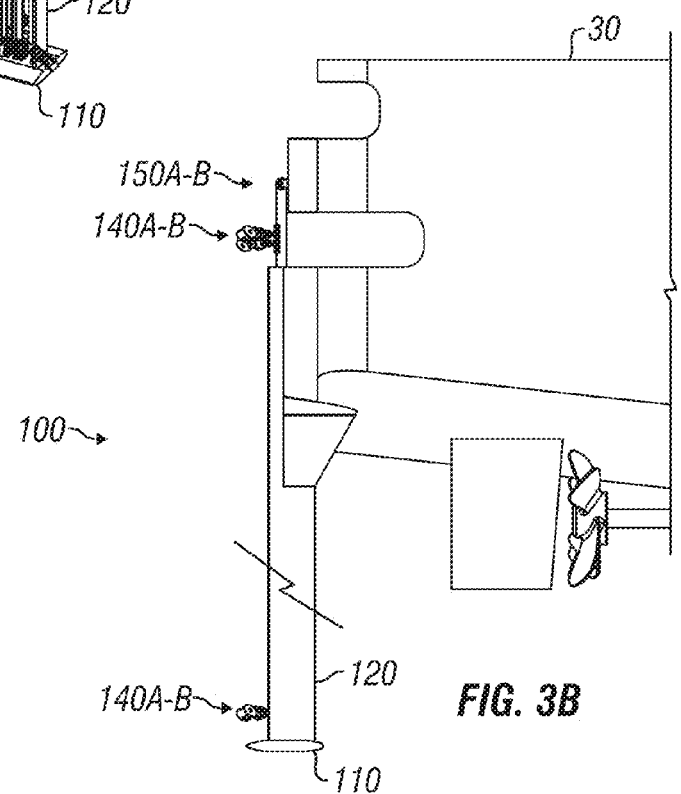

FIGS. 3A-3B show another vessel 30 according to the present disclosure having one or more skegs 100 extending from its aft as before. Here, two skegs 100 are shown (one port side and another starboard side), but more or less can be used. These skegs 100 also have adjustable tow points.

Each skeg 100 includes a conduit 120 for passage of lead-in lines for streamers and source cables (not shown). Moveable over or along these conduits 120, each of the skegs 100 has one or more shuttles or elevators 140A-B, which can have one or more tow points 142. The one or more shuttles 140A-B can be moved up and down the conduits 120 using pulley systems 150A-B to raise and lower the shuttles 140A-B and their tow points 142.

As noted before, the skegs 100 protect the seismic gear to get it under the water's surface (e.g., where ice is located). Additionally, the skegs 100 help move the tow points 142 for the seismic spread (20) to a desired depth at or below the vessel's keel. The shuttles 140A-B can give the spread (20) of the seismic system more stability and can allow the tow points 142 for the streamers, sources, and other cables to be at or near the desired towing depth of the system under the surface of the water.

In FIGS. 3A-3B, the skegs 100 each have two shuttles 140A-B that can be independently moved up and down along rails 130 disposed on the conduits 120. Each shuttle 140A-B has one or more tow points 142, which can include eyelets, pulleys, or other connectors for connection to towlines (not shown) and the like of the seismic system to be deployed, towed, and retrieved from the vessel 30.

For illustrative purposes, the shuttles 140A-B are shown in two extreme positions—one upward position toward the vessel's deck and another downward position toward the skeg's base 110. In reality, each skeg 100 may have only one set of shuttles 140A-B that can be moved by the pulley systems 150A-B between these upward and downward positions. However, in other arrangements, each pulley system 150A-B can be used to move multiple ones of the shuttles 140 or larger shuttles 140 along the rails 130.

Figure 3C:
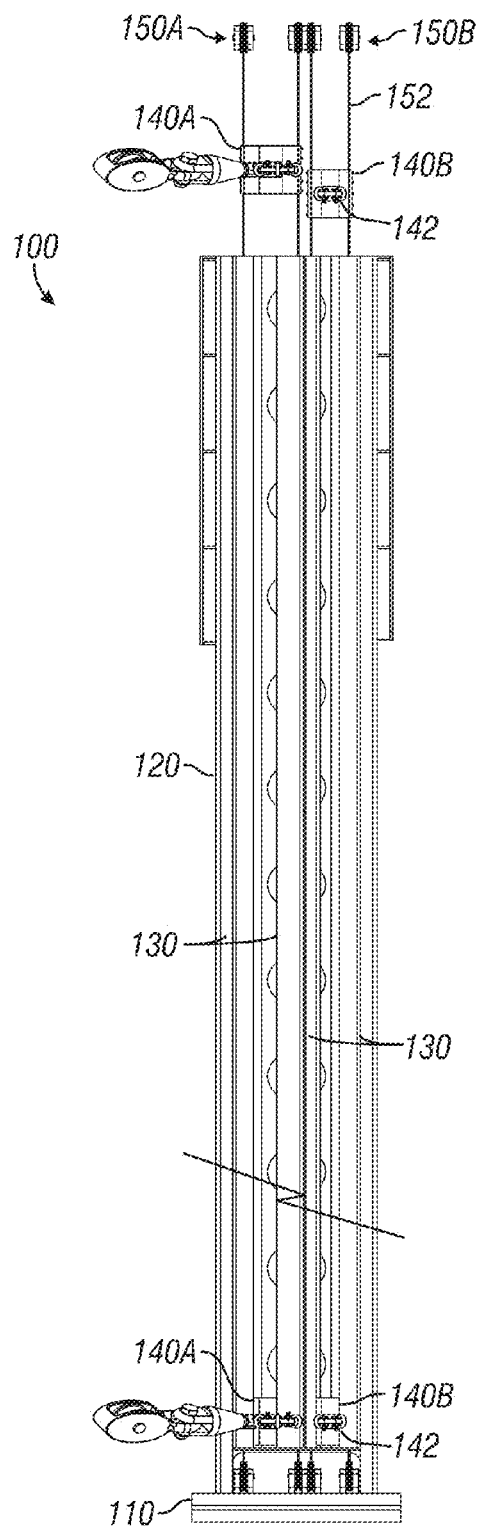
FIG. 3C shows the skeg having adjacent shuttles.
Figure 3D:
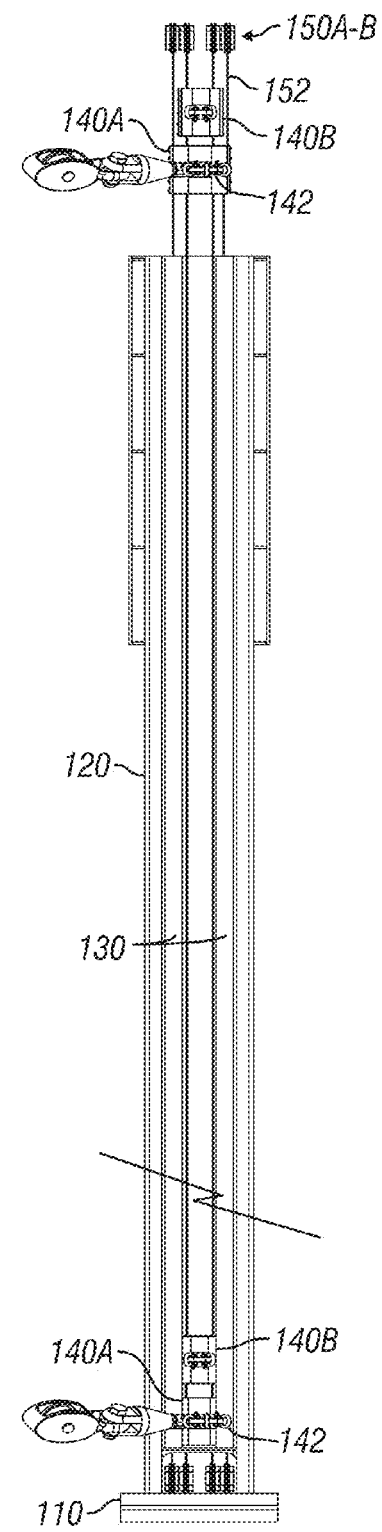
FIG. 3D shows the skeg having stacked shuttles.

In FIG. 3C, the skeg 100 is shown with the shuttles 140A-B set side-by-side so they can be moved with respect to one another by adjacent pulley systems 150A-B. In FIG. 3D, the shuttles 140A-B are stacked on the skeg 100 and can be moved with respect to one another by inner and outer pulley systems 150A-B.

The shuttles 140A-B on the skegs 100 of FIGS. 3A-3D allow operators to recover streamers and sources separately and/or independently. Retrieving the lower stacked shuttle 140A and its connected tow lines in FIG. 3D requires concurrent retrieval of the other stacked shuttle 140B, even though the shuttles 140A-B can be moved separately. Deployment of these shuttles 140A-B in FIG. 3D can be stacked or concurrent. By contrast, the adjacent shuttles 140A-B in FIG. 3C can be moved separately and can be deployed and retrieved independently, which can have a number of advantages in the field.

Figure 4A:
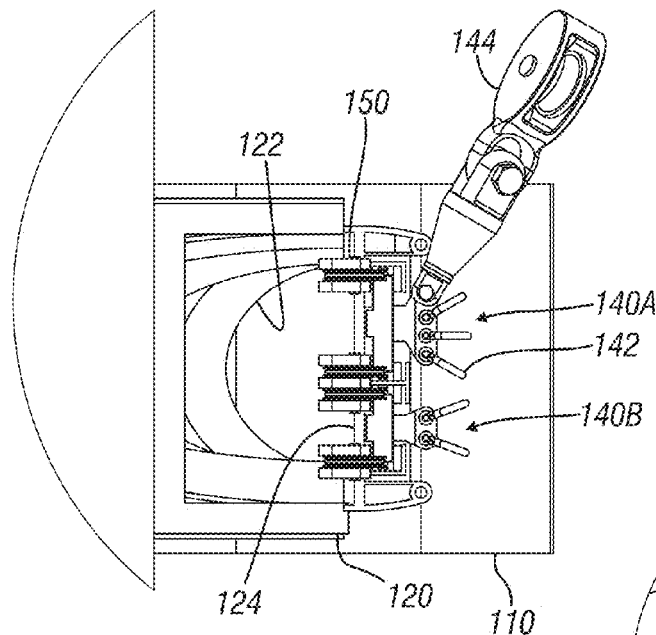
FIG. 4A shows a top view of the skeg of FIG. 3C.
Figure 4B:
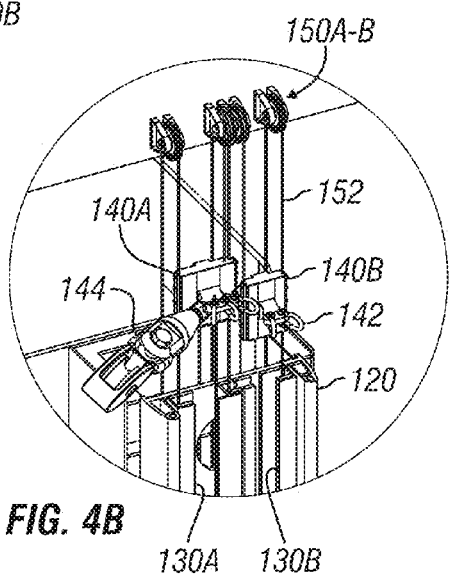
FIG. 4B shows a detailed view of the pulley systems for the skeg of FIG. 3C.
Figure 4C:
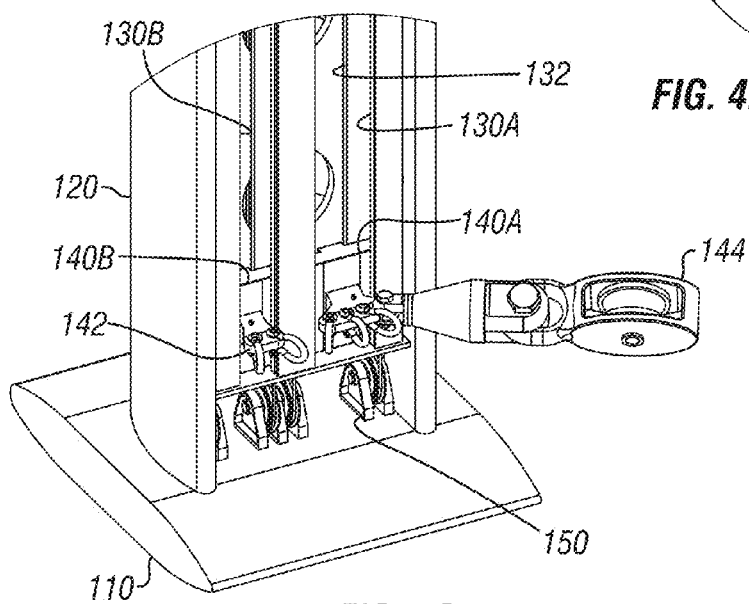
FIG. 4C shows a detailed view of the distal end of the skeg of FIG. 3C.

Turning to FIG. 4A-4C, additional details of the skeg 100 as in FIG. 3C are disclosed. FIG. 4A shows a top view of the skeg 100 having the adjacent shuttles 140A-B, FIG. 4B shows a detailed view of the pulley systems 150A-B, and FIG. 4C shows a detailed view of the end of the skeg 100. Although these details are provided for the skeg 100 as in FIG. 3C, similar details would pertain to the skeg 100 of FIG. 3D.

Each shuttle 140A-B is moved by its respective pulley system 150A-B, and the shuttles 140A-B move over the conduit's passage 122, which is separated from the shuttles' track by a separation or wall 124. One shuttle 140A may be larger than the other shuttle 140B and may have more tow points 142, although other configurations can be used. For instance, the inboard shuttle 140B mounted on the inboard side of the skeg 100 can be used to tow the sources. The outboard shuttle 140A mounted on the outboard side of the skeg 100 can be used to tow the streamers and paravanes. For the paravane's tow ropes and other outboard towing, the tow point 142 can use a swivel and pulley assembly 144.

As shown in FIGS. 4B-4C, the pulley systems 150A-B use upper and lower sheaves and steel cables. The upper sheaves can use motors (not shown) to move the cables and shuttles 140A-B. To facilitate movement of the shuttles 140A-B along the rails 130, low friction bars 132 composed of nylon or the like can be set on both sides of the shuttle 140A-B.

While the shuttles 140A-B are raised and lowered or set in position on the skeg 100, the edges of the rails 130 hold the shuttles 140A-B and provide horizontal support for the towlines of the seismic system behind the vessel 30. If desired, additional lock or brake features can be used to fix the shuttles 140A-B vertically in the rails 130. Locking of the pulley systems 150A-B can also hold the shuttles 140A-B vertically in place during operations.

C. 3-D Seismic System Towed Beneath Surface

Figure 5A:
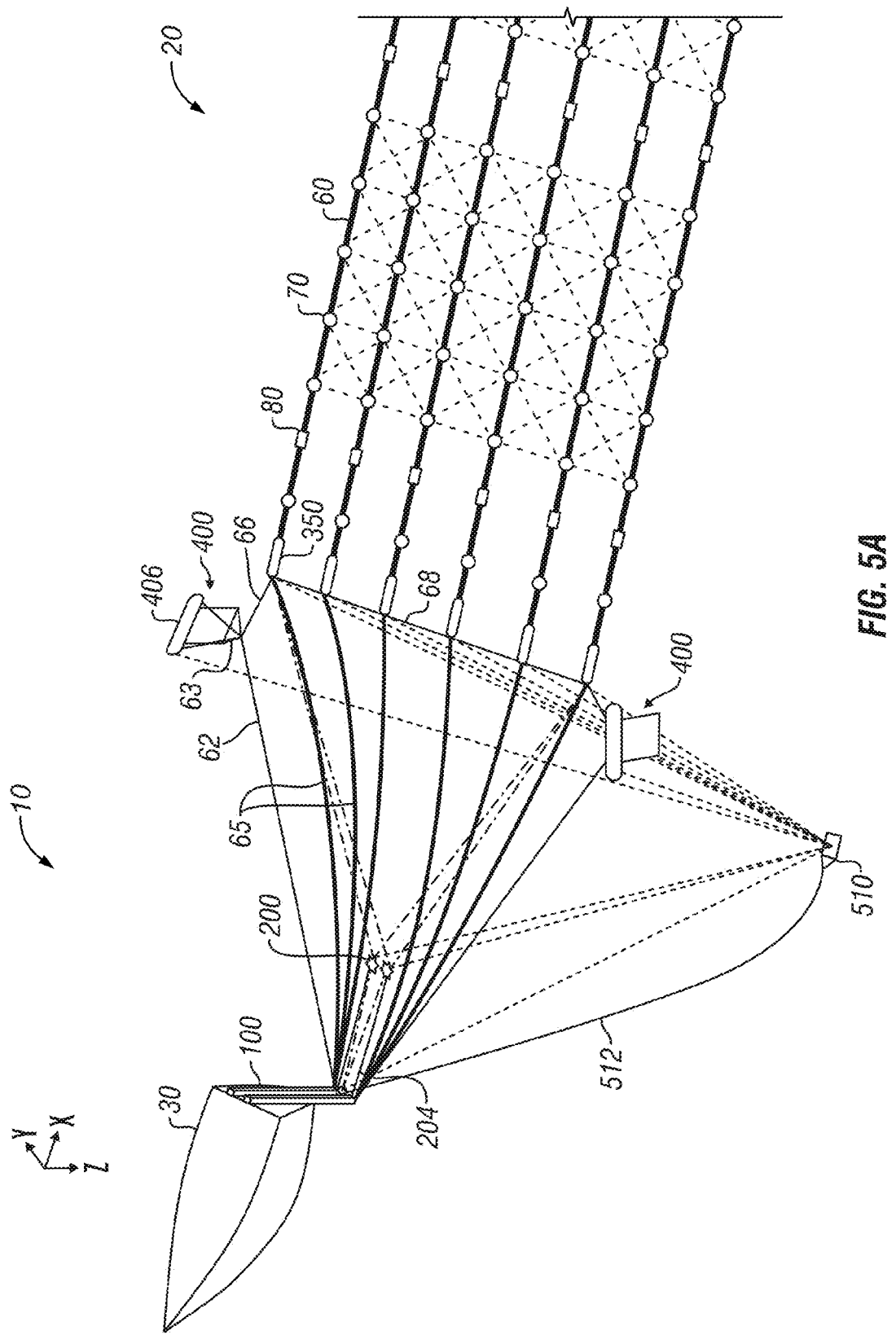
FIG. 5A illustrates a perspective view of the disclosed marine seismic survey system, revealing some additional components.

FIG. 5A illustrates a perspective view of additional components of the disclosed seismic survey system 10 according to the present disclosure. The system 10 includes one or more skegs 100 on the aft of the vessel 30. The one or more skegs 100 tow the spread or array 20 of multiple streamers 60 and tow one or more sources 200 behind the vessel 30 during the survey. The skeg 100 holds the cables and towlines for these seismic components under the water's surface so the system 10 can be used in a seismic survey in icy regions, turbulent waters, or the like. As noted above, the skeg 100 can have independently movable shuttles and tow points so operators can separately deploy and retrieve the streamers 60 and sources 200.

As noted herein, the system 10 tows the components of the spread 20 under the surface of the water for use in regions where the surface is congested with ice or in rough weather conditions where towing below the influence of wave action can benefit the recording. To do this, the streamers 60, the sources 200, and the paravanes 400 all use floatation devices to maintain them at a desired level under the water's surface.

The one or more sources 200, which can use air gun arrays or the like, are deployed behind the vessel 30 and typically ahead of the spread 20. The sources 200 are towed using cables 204 and towlines (not shown) from the skeg 100, which pull the sources 200 below the water's surface. The one or more sources 200 are detached from the streamer spread 20 and have floatation devices described in more detail below. The sources 200 can also be actively controlled using techniques, such as disclosed in the incorporated parent applications.

The streamers 60 are deployed in the spread 20 with the lead-in cables 65 (and optionally tow lines (not shown)) extending from the skeg(s) 100 under the water's surface. Towlines 62 and deflector straps 63 connect to the paravanes 400, and spur lines 66 connect the paravanes 400 to spreader ropes 68, which extend across the streamers 60 near the head floats 350. During operations, the paravanes 400 on the outer edges hold the streamers 60 expanded in the spread 20.

The streamers 60 include the head floats 350 at the front end of the streamers 60. The head floats 350 are built to neutrally offset the point load of the lead-in cables 65 of the streamers 60 and the spreader ropes 68. Extending beyond the head floats 350, each streamer 60 has a number of seismic sensors 70, control devices 80, and other positioning and sensing equipment discussed below. Additional floats 350 can be also used on different locations of the streamer 60 if necessary.

As an alternative to using the head floats 350, the buoyancy can be distributed along the lead-in cable 65 as either a buoyant vibration isolation module, or other externally mounted buoyant covering. The buoyancy on any of these items can be either static or active.

The paravanes 400 are built to be neutrally buoyant and have floatation devices 406 as described below. The tow lines 62 for the paravanes 400 preferably use rope that is essentially neutrally buoyant. For example, the paravane's tow lines 62 can be a high modulus polyethylene (HMPE) rope or other material.

Because the system 10 is towed below the surface of the water, various physical influences of drag, buoyancy, weight, and other factors have an effect on the depth and behavior of the system 10 under water. To that end, hydrodynamic modelling is performed on the desired system 10 to understand the relationship between tow/drag forces, buoyancy/weight, and other factors of each component of the system 10 and how they operate together. Certain components of the system 10 are designed to be neutrally buoyant, while other components are designed to offset the weight of the more conventional equipment. Each of the buoyant components is preferably designed of a syntactic or other incompressible foam so that buoyancy remains relatively constant versus depth for the purposes of control.

Figure 5B:
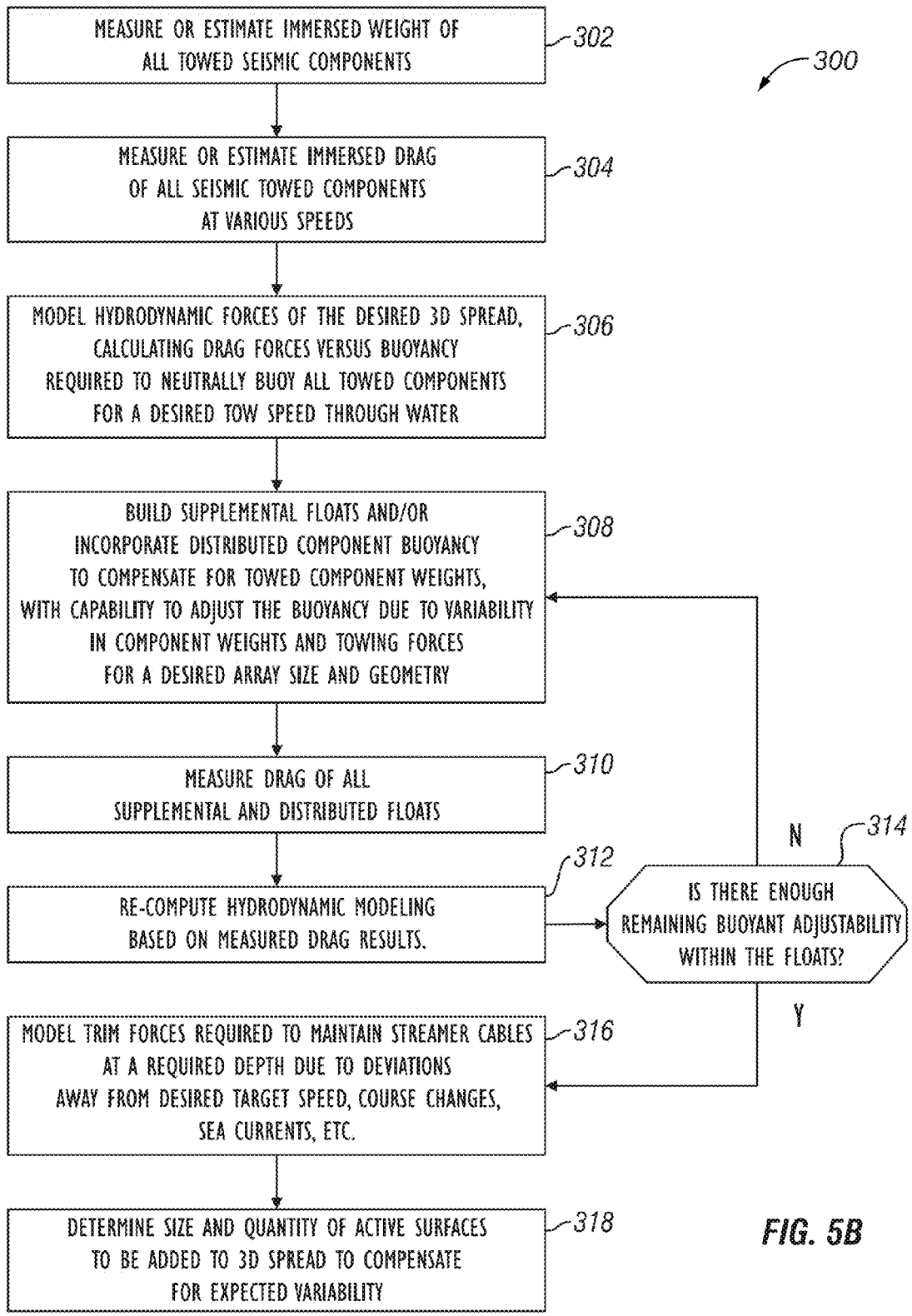
FIG. 5B shows a process in flow chart form for constructing a neutrally buoyant 3D spread, such as in FIG. 5A.

FIG. 5B shows a process 300 in flow chart form for constructing a neutrally buoyant 3D spread of a system, which involves steps of the modeling and manufacturing decisions that need to be made in configuring the spread. For illustrative purposes, references may be made to the system 10 of FIG. 5A, but the process 300 can be applied to any configuration. In fact, the configuration of the towed seismic equipment, such as the desired size of the 3D spread 20, the number of streamers 60, the number of receivers 70, the number of sources 200, the lengths of the streamers 60, etc., and the particular types of equipment used are mainly dictated by the implementation and the proposed use of the seismic system 10. These and similar considerations will form part of disclosed process 300 as will be appreciated by one skilled in the art, but they are not detailed here.

Having an understanding of the towed components for the particular configuration of the desired spread 20, operators measure or estimate the immersed weight of all towed seismic components of the spread 20 (Block 302) and measure or estimate the immersed drag of all of the towed components of the spread 20 at one or more (and preferably various) tow speeds (Block 304). The tow speeds of interest are those expected or planned for the seismic vessel 30 when traversing survey lines during a survey. The determination of the immersed weight and drag of the towed components may or may not include results for floats already incorporated into some of the components.

Using hydrodynamic modelling, such as available in software, operators model the hydrodynamic forces of the desired spread 20 and calculate the drag forces versus buoyancy required to neutrally buoy all of the towed components for one or more desired speeds through water (Block 306). For example, in designing the system 10, the numeric hydrodynamic analysis is run on the desired 3D streamer spread 20 to understand the forces on all aspects of the submerged towed components. One particular hydrodynamic modelling software program or algorithm that could be used for these calculations, includes OrcaFlex available from Orcina Ltd. of the UK, although others could be used. Buoyant components (source floats, head floats 350, paravane floats 406, etc.) attached to or used on the sources 200, the streamer lead-ins, the paravanes 400, etc., may form part of this modelling.

Once modeling has been done, operators configure an amount of floatation that needs to be included into the spread 20 to neutrally buoy all of the towed components based on the modelled hydrodynamic forces and calculated forces versus buoyancy (Block 308). Configuring the floatation involves building supplemental syntactic floats for the towed components and/or incorporating distributed component buoyancy into the spread 20. The syntactic floats and/or incorporated distributed component buoyancy are configured for the spread 20 to compensate for the weights of the towed components and towing forces. Because the spread 20 may need to be adjusted in the field or to meet a particular implementation, the configured floatation is preferably capable of having its buoyancy adjusted to account for variability in the component weights and the towing forces for a desired array size and geometry of the spread 20.

For instance, buoyant components (i.e., floats) for the spread 20 are configured to suit the buoyancy requirements at each attachment point to neutrally counteract the weight and forces on the system's components. To configure these buoyant components, the buoyancy they provide is preferably trimable to within some percentage of the modeled requirement so that adjustments in the field can be made. As already noted, the flotation used for the buoyant components is preferably of the syntactic type, whereby differences in depth will not change the inherent buoyancy of the components due to hydrostatic pressures. This also extends the operational depth that the streamer spread 20 can operate for deep tow applications.

Having configured the floats for the spread 20, operators then measure or estimate the drag of all of the floats (Block 310) and re-compute the hydrodynamic modeling of the 3D spread 20 based on the measured drag results (Block 312). This is done because the configured floatation may alter the dynamics of the spread 20 so that variables need to be reassessed.

As noted above, the buoyancy of the supplemental and distributed floatation can preferably be adjusted to account for variability in the component weights and the towing forces. Therefore, an assessment can be made at this point to determine if enough buoyant adjustability is available within the floats so they can be adjusted as needed in the field (Decision 314). If the buoyancy of the floats does not have the ability to provide a desired range of adjustable buoyancy, the process 300 returns to previous steps by building and distributing supplemental floatation for towed component weights and towing forces to increase the overall adjustability of the spread's buoyancy (Block 308). The adjustable buoyancy that a spread would preferably have can depend on the particular implementation and a number of factors. In general, each of the various floats preferably have the capability to adjust buoyancy on the order of +/−100 kg (200 kg total) so that the final buoyancy is within +/−25 kg (50 kg total). Several birds can then be used to compensate for the +/−25 kg of residual trim.

Should enough adjustability for the buoyancy already be configured into the floatation for the spread 20, the arrangement of the towed components in the seismic spread can be constructed with the configured floatation (i.e., floats) for the particular towed components, point loads, and the like so that the spread 20 can be towed and remain neutrally buoyant during operations.

As may be expected, operational parameters and conditions may change during the survey, and the spread 20 is preferably designed and constructed to meet such changes. To that end, once the flotation has been configured with desired adjustability (Decision 314), operators model the trim forces that would be required to maintain the streamers 60 at a required depth due to deviations away from a desired target tow speed, course changes, sea currents, environmental conditions, water salinity, water temperature, and the like (Block 316). Again, hydrodynamic modelling can be performed using hydrodynamic modelling software with inputs for the modelled 3D spread 20 along with variables, such as expected two speed variations, anticipated course changes, expected sea currents, and other such parameters and conditions. For example, the hydrodynamic modelling can be calculated over a range of expected tow speeds (e.g., 2-6 knots) to understand the relationship of variable drag versus point loads within the particular components to be used.

The trim forces being calculated are those adjustment forces that would need to be made by components of the spread 20 to account for deviations in the various variables during operations so that the spread 20 can be towed and remain at the survey tow depth as desired. Based on the calculated trim forces, operators determine the size and quantity of active surfaces 80 to be added to the spread 20 to provide adequate trim forces to compensate for the expected variability (Block 318). These active surfaces 80 can include the control devices, foils, and the like, as disclosed herein. Although other locations for the active surfaces 80 can be used, such active surfaces 80 are preferably added at the head of the spread 20 at the lead ends of the streamers 60, which can simplify control and operation of the system 10. (Depending on the circumstances, it may be necessary to measure or estimate the drag of all of the active surfaces 80 and re-compute the hydrodynamic modeling of the 3D spread 20 based on the measured drag results.)

The active surfaces 80 can be used to compensate for expected variations in speed or other variables. Some of the active surfaces 80 can be standard cable birds or can be modified active devices with larger wing surfaces and force depending on the level of variability expected. Preferably, several of these active surfaces 80 are placed close to the streamer's head floats 350 (i.e., in a stretch section) depending upon the level of depth variability that is expected.

In the end, the seismic spread 20 is constructed with the arrangement of the buoyant components (e.g., the source floats, head floats 350, paravane floats 406, etc.) and the active surfaces 80. Once constructed, the entire streamer spread 20 can be towed fully submerged without the need for surface reference items. With the spread 20 deployed in the water within an acceptable range of trimmed buoyancy, the active surfaces 80 can then adjust for any fluctuations in speed, course direction, environmental condition, water salinity, water temperature, ocean current, and the like.

D. Buoyancy Control

To control the buoyancy of the system 10, the source 200 can use a floatation system as shown and discussed with reference to FIGS. 6, 7, and 8A-8D. The streamers 60 can use a floatation system as shown and discussed with reference to FIGS. 6 and 9A-9B. The paravanes 400 can use a floatation system as shown and discussed with reference to FIGS. 10A-10B. Finally, the streamers 60 can use control devices as shown and described with reference to FIGS. 11A-11B.

1. Source Floats

Figure 6:
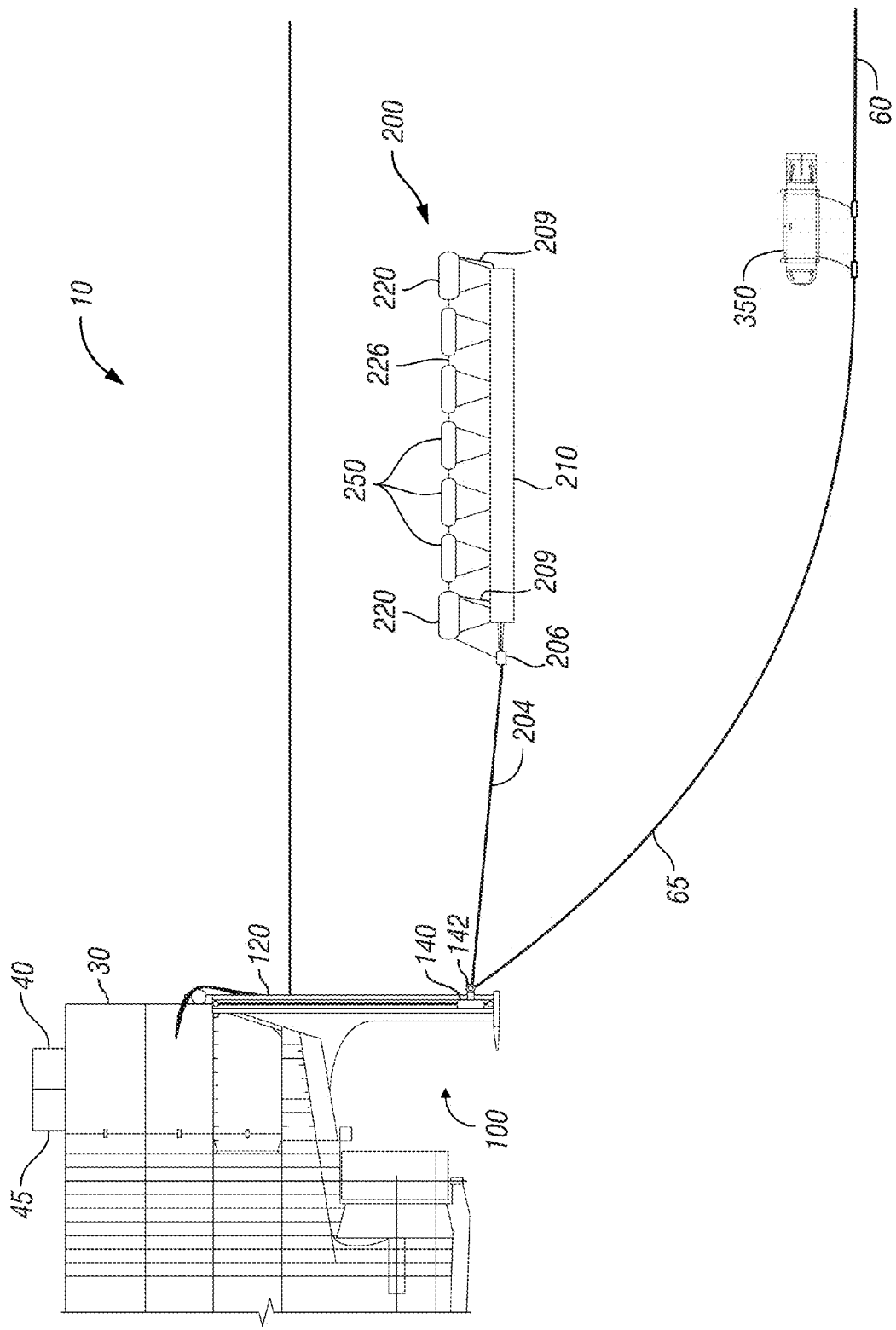
FIG. 6 illustrates flotation components according to the present disclosure for the source and one of the streamers towed behind the vessel with the skeg in the system of FIG. 5A.

Turning first to the buoyancy control of the source 200, FIG. 6 shows portion of the vessel 30 with the skeg 100 having a shuttle 140 according to the present disclosure. In this side view, the skeg 100 is shown towing a source 200 and a streamer 60 of the 3D spread (20 of FIG. 5A).

The source 200 uses a floatation system to support a source component 210 towed by the vessel 30 with an umbilical cable 204 from the skeg 100. The source component 210 can be a seismic source, an air gun source, electromagnetic source, magnetic source, sonar device, sound or imaging device, or other towed component. Other sources 200 can also be used in the system 10.

The floatation system for the source 200 uses a number of floats or buoys 220 and 250 interconnected together. At least one of the floats 220 is depth controlled, meaning that the buoyancy of the float 220 is actively controlled. For example, this float 220 can have its depth within the water column automatically controlled at the float 220 and/or operationally controlled from the vessel's control unit 40. User interface screens for monitoring the depth controlled float 220 can be accessed on a monitor associated with the vessels' control unit 40. In this way, operators on the vessel 30 can use the screens to monitor the operation of the depth controlled float 220 and read its measured parameters, such as depth, air pressure, humidity, temperature, and the like. Also, operators on the vessel 30 can adjust the operating parameters of the float 220, such as changing the controlled depth for operation. This may be especially useful to alter the seismic operations or to dive the source 200 deeper in the water column to avoid a surface obstruction.

One or more second floats or buoys 250 of the source floatation system have adjustable buoyancy and are tethered to the depth controlled float 220. These adjustable buoyancy floats 250 have their buoyancy modelled and preconfigured before deployment for a particular implementation. For example, the buoyancy for each of these floats 250 is configured for the towed component or portion of the towed component, which the float 250 is used to support, its placement in the system 10, expected tow speed, drag forces, etc.

As shown, at least one depth controlled float 220 is preferably disposed first in line with the one or more second floats 250 tethered behind and intended to follow the lead of the first float 220. The connections 226 between each of the floats 220 and 250 are preferably flexible and allow the various floats 220 and 250 to move relative to one another.

Other configurations can be used. For example, another depth controlled float 220 can be disposed at the end of the set of adjustable floats 250, as shown in FIG. 6. Accordingly, the flotation system for the source 200 can have one or more of the depth controlled floats 220 and one or more of the adjustable floats 250 in any desired arrangement.

One or more lines 209 from the supply cable 204 connect to the one or more depth controlled floats 220. Pneumatic fluid from a pneumatic fluid source 45 on the vessel 30 communicates through the supply cable 204 and lines 209 to the floats 220 for filling internal volumes. Preferably, the pneumatic fluid is pressurized air, but other gaseous fluids can be used. Also, the pneumatic fluid can be a liquid lighter than water. Yet, the liquid should not be exhausted to the marine environment unless safe to do so. Thus, in some arrangements, a return line (not shown) from the floats 220 may run back to the source 45 on the vessel 30.

Internally, each of the one or more floats 220 has a controller (not shown) that regulates the pneumatic fluid (air) contained in the floats 220 and controls the floats' buoyancy in the water column. In this way, the floats 220 can be maintained at a desired level and can adjust to other levels as needed. Not only does this allow the floats 220 to remain unaffected by surface obstructions or wave action if present, the floats 220 can support the towed component 210 at a consistent depth, which can simplify data acquisition as discussed herein. Additionally, the floats 220 can divert the towed source component 210 to a greater depth while being towed to avoid any obstructions on the water's surface, such as ice keels and the like.

Figure 7:
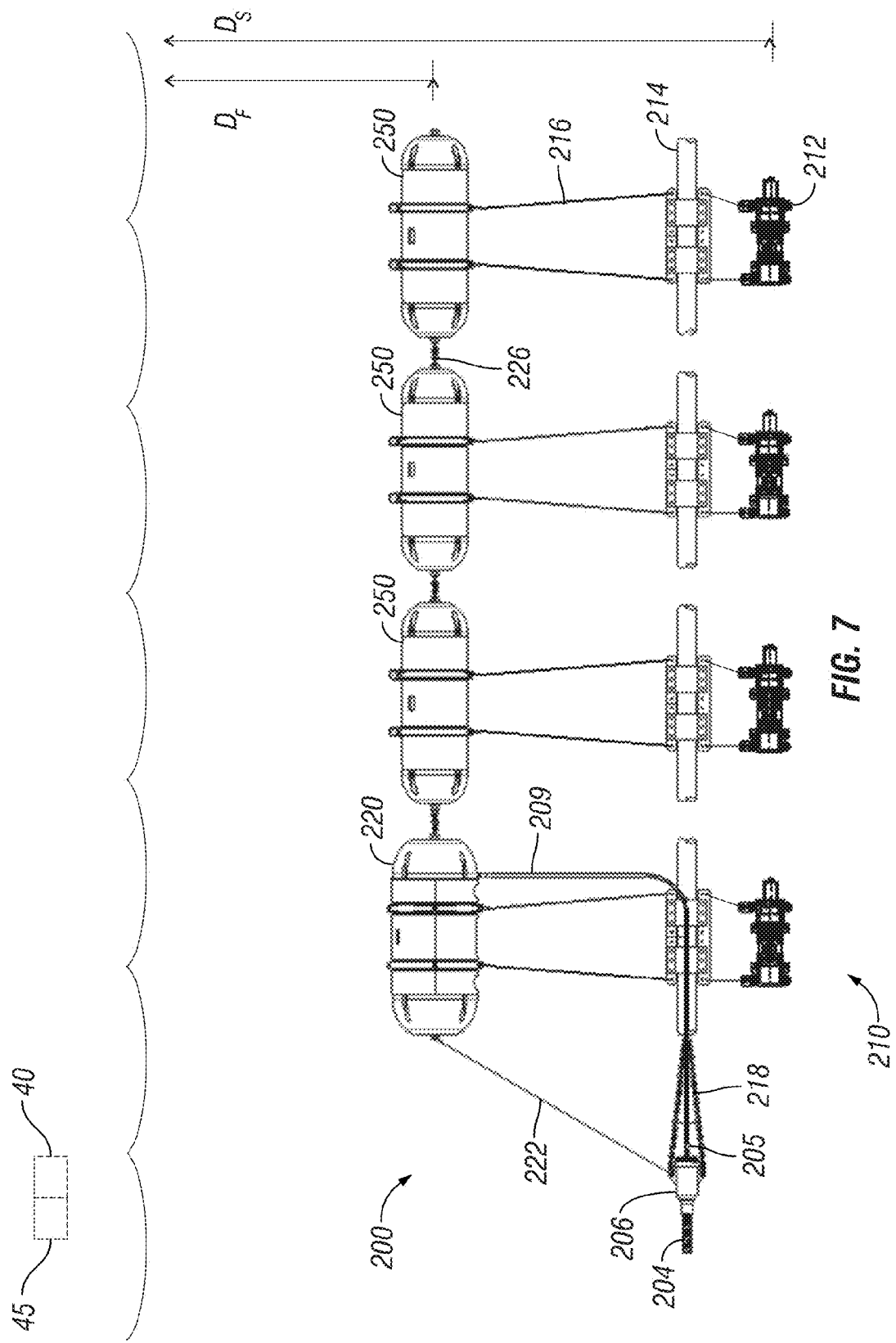
FIG. 7 illustrate the floatation components for the source in FIG. 6 in more detail.
Figure 8C:
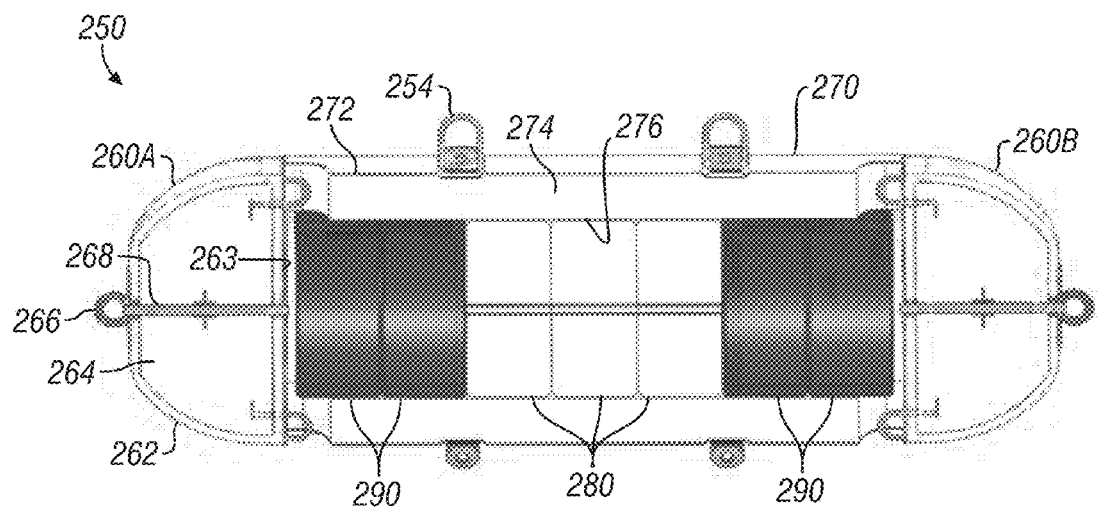
Figure 8D:
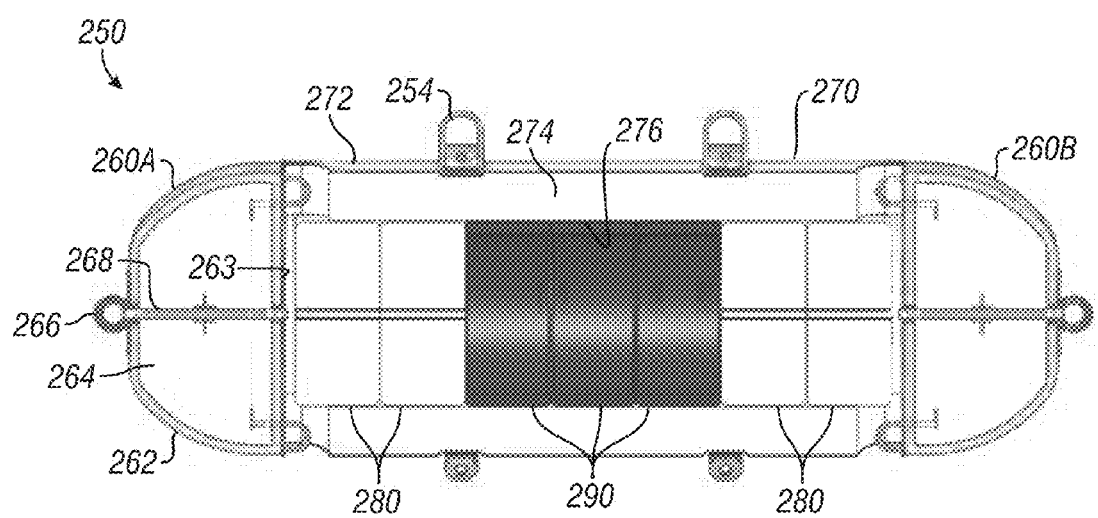

Turning now to FIG. 7, an embodiment of the flotation system for the source 200 of FIG. 6 is shown in more detail. As noted above, the system has one or more depth controlled floats 220 and one or more adjustable floats 250 tethered together by tether lines 226. As before, the system can be towed behind the vessel (not shown) by the umbilical cable 204 connected to the vessel's skeg (not shown), and the system can be used to support a towed component and can connect by a supply line 205 to a pneumatic fluid source 45 on the vessel 30.

In this embodiment, the towed source component 210 is an array of air guns 212 towed in the water and connected by the umbilical cable 204 and an air supply line 205 to a pressurized air source 45 on the vessel (not shown). In the present example, each of these floats 250 can having its buoyancy preconfigured to counterbalance the weight in water of the associated air gun 252 that the float 250 supports in the air gun array 250.

The depth controlled float 220 connects to the umbilical cable 204 with a tether 222, and each float 220 and 250 supports portions of the air gun array 210 with tether lines 216. A tap off line 209 from the air supply line 204 connects to the depth controlled float 220 and supplies the pressurized air needed to control the depth $D_F$ of the floats 220 and 250 and by extension the depth $D_S$ of the source component 210 during operations detailed below. Particular details of the depth controlled float 220 of the system are disclosed in the incorporated patent applications and are not repeated here.

FIGS. 8A-8D illustrate side, exploded, and two cross-sectional views of the adjustable float 250 of the system in FIG. 7. The adjustable float 250 includes end caps 260A-B and a main body 270. Straps 254 composed of metal dispose on the main body 270. The straps 254 for the adjustable float 250 can be one-piece as shown and may have rubber bonded to the inner surface.

The end caps 260A-B affix to the ends of the main body 270 using tie rods 252 that pass through the periphery of the main body 270 and connect the end caps 260A-B to each end of the main body 270.

Each end cap 260A-B has an outer shell 262 filled with a foam 264 or other buoyant material. Central tie rods 266 with eyelets at their ends for connecting to tether lines are disposed through the end cap 260A-B and connects to a metal plate 263 on the inside surface of the end cap 260A-B that rests against the main body 270. Preferably, the tie rod 266 has a weldment 268 to help secure the foam 264 in the end cap 260A-B to the tie rod 266.

Externally, the end caps 260A-B preferably have protective wear plates where the eyelets of the tie rods 266 extend from the end cap 260A-B. The float 250 connects to other floats using the tow eyelets on the end tie rods 266, and the desired apparatus to be supported by the float 250 (e.g., one of the air guns) connects to the pad eyes on the straps 254. Lifting hoops on the straps 254 are used for lifting the float 250 during installation and the like.

The main body 270 has an outer shell 272 surrounding buoyant material 274, which can be a 29-pcf foam. Rather than holding an air tank, the main body 270 has a hollow core 276 that holds a plurality of buoyancy elements 280 and/or spacers 290. Each of the buoyancy elements 280 has a foam insert is surrounded by a reinforcing rim. The foam insert 282 can be composed of 29-pcf foam, and the rim 284 can be a section of plastic material. The spacers 290 do not have foam and are instead simply neutral rings, which can be made from sections of HDPE pipe and with dimensions of 18" OD×7.75" long, for example.

The buoyant force provided by the float 250 when disposed in water can be adjusted or "trimmed" using the buoyant elements 280 and spacers 290. For example, one (or both) of the end caps 260A-B can be removed from the main body 270, and the hollow core of the main body 270 can filled with the desired ratio of buoyant elements 280 and spacers 290. If a minimum buoyancy is desired, the main body's hollow core can be left empty. Increased buoyancy can be achieved by adding buoyant elements 280 and filling any remaining space with the neutral spacers 290. For full buoyancy, the hollow core of the main body 270 can be entirely filed with the buoyancy elements 280.

For example, the hollow core 276 can have space for seven elements. The maximum buoyancy can be 670-lbs. with all of the spaces filled with buoyant elements 280. This would equate to a maximum weight in air of about 1030-lbs. Intermediate buoyancy values for the float 250 can then range from about 630-lbs. (six buoyant elements 280 and one spacer 290) to about 425-lbs. (one buoyant element 280 and six spacers 290) with intermediate values therebetween. The minimum buoyancy can be 389-lbs. when the hollow core 276 is empty. As will be appreciated, the configuration of the interior spaces discussed above is meant to be exemplary and may differ for a given implementation.

The buoyancy for each of the adjustable floats 250 in FIG. 7 is configured for the particular air gun or portion of the source array that the float 250 is set to support. The gun is weighed in water, or its weight in water is calculated. The buoyancy for the float 250 is then configured to counterbalance the weight of the supported gun in water.

2. Head Floats

In FIG. 6, the head float 350 supports the streamer 60 towed by the vessel 30 with a lead-in cable 65 from the skeg 100. Other streamers 60 in the spread can be similarly arranged in a plane adjacent the shown streamer 60 using spread cables and paravanes (not shown).

Figure 9A:
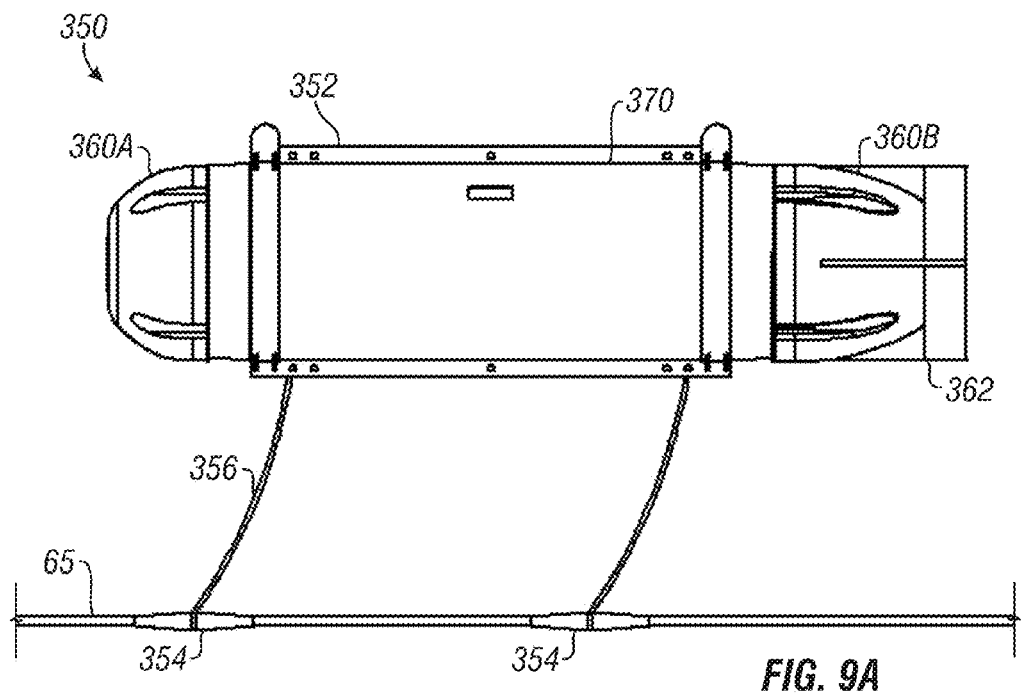
FIG. 9A illustrate an adjustable buoyancy float for the streamer as in FIG. 7.

The head float 350 can be similar to the second floats or buoys 250 of the source floatation system so that the head float 350 for the streamer 60 can also have adjustable buoyancy. The head float 350 is tethered to the lead-in cable 65 from the skeg 100. Preferably as shown in FIG. 9A, the head float 350 is mounted directly above the lead-in cable 65 and can use brackets 352, 354 and lines 356. In another arrangement depicted in FIG. 9C, the head float 350 can couple directly onto the lead-in cable 65.

As shown in FIG. 9A, the head float 350 has a main body 370 with a bracket arrangement 352 disposed thereon, which connects by lines 356 to brackets 354 on the lead-in cable 65. End caps 360A-B can mount on the main body 370, and the aft end cap 360B can have stabilizing fins 362 or the like.

The adjustable buoyancy head float 350 has its buoyancy configured before deployment for a particular implementation. For example, the buoyancy for the head float 350 is configured for the towed streamer 60, the depth that the streamer 60 is to be towed, the tow speed, etc. If necessary, the head float 350 on the streamer 60 can also include a depth controlled float, similar to the float 220 on the source 200. In this case, a fluid source may need to communication from the vessel to the float 350 in a manner similar to that discussed above.

Figure 9B:
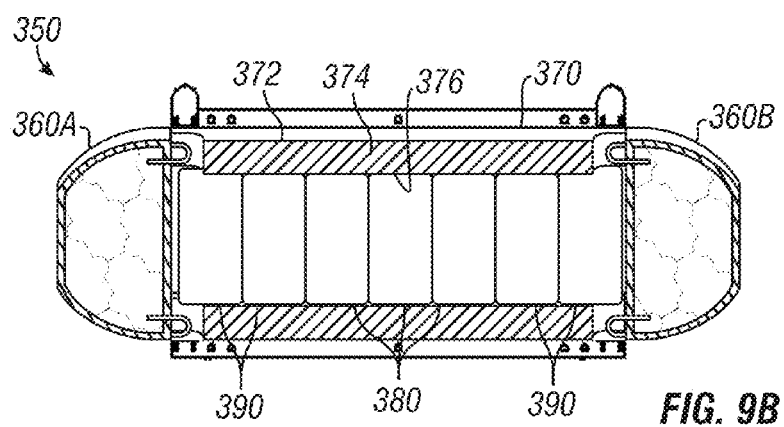
FIGS. 9B-9C illustrate cross-sectional views of the adjustable buoyancy float for the streamer as in FIG. 7.
Figure 9C:
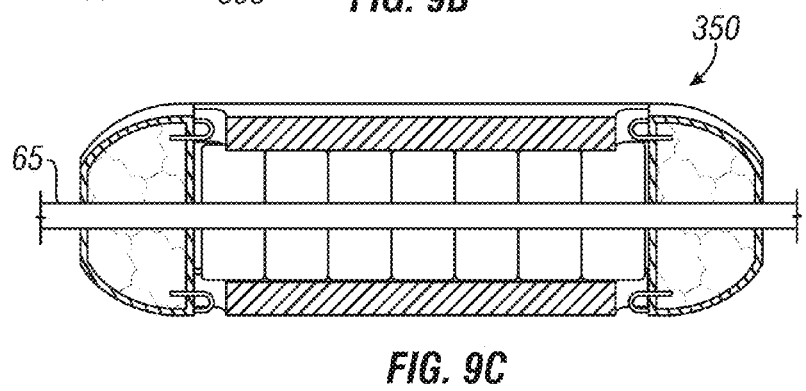

FIG. 9B illustrates a side cross-section of the head float 350 according to the present disclosure. In general, the float 350 is similar to the adjustable buoyancy floats 250 of the source 200 discussed above.

As shown in FIG. 9B, for example, the float 350 includes a main body 370 and end caps 360A-B. The main body 370 has an outer shell 303 surrounding buoyant material 374. The main body 302 has a hollow core 376 that holds a plurality of buoyancy elements 380 and/or spacers 390. Each of the buoyancy elements 380 has a foam insert, which can be surrounded by a reinforcing rim. The spacers 390 do not have foam and are instead simply neutral rings, which can be made from sections of HDPE pipe, for example.

The buoyant force provided by the float 350 when disposed in water can be adjusted or "trimmed" using the buoyant elements 380 and spacers 390. For example, one (or both) of the end caps 360A-B can be removed from the main body 370, and the hollow core 376 of the main body 302 can be filled with the desired ratio of buoyant elements 380 and spacers 390. The buoyancy for each of the adjustable floats 350 is configured for the particular streamer (60) that the float 350 is set to support and any other factors noted herein.

3. Paravanes

FIG. 10A shows an example of a paravane 400 that can be used with the disclosed system to support streamers or a seismic source. This paravane 400 has a frame 404 holding one or more louvers or vanes 402 intended to engage the water when towed therein. Other configurations for the paravane 400 can be used.

Because the paravane 400 supports streamers (60) towed below the surface of the water, the paravane 400 is preferably neutrally buoyant. Accordingly, the paravane 400 can have a buoyancy element or float 406 disposed thereon or connected thereto that is intended to make the paravane 400 neutrally buoyant at a predetermined depth. Additionally, the paravane 400 may have controllable wings (not shown) as disclosed elsewhere herein to control the depth of the paravane 400 when being towed.

In one example, this buoyancy element 406 may be filled with a foam or the like so that the element's buoyancy can be set for a particular depth before being deployed. In fact, the adjustable buoyancy for the element 406 can use components similar to the adjustable buoyancy float disclosed above with reference to FIGS. 8A-8D and 9A-9B.

Alternatively, in addition to any foam, the buoyancy element 406 can contain a fillable volume (e.g., bladder or chamber) as disclosed herein to configure its buoyancy and control its depth. In FIG. 10B, for example, the details of a paravane 400 having a dynamic buoyancy element 406 are diagrammatically illustrated.

As expected, the paravane 400 acts as a wing or door while being towed in the water. Gravity acts to pull the paravane 400 to greater depths, the passing water acts against the surface of the paravane 400, and the towlines pull the paravane 400 against the water. Finally, the buoyancy element 406 acts to maintain the paravane 400 at a desired depth in the water. At the same time, the arrangement of the paravane's geometry and the applicable forces must be handled so that the paravane 400 remains stable in the water when being towed and does not twist and turn due to torque.

To maintain depth and stability, the buoyancy element 406 can include a depth sensor 401, a controller 405, and a buoyancy chamber 407. In response to changes in the depth beyond a desired level detected by the depth sensor 401, the controller 405 can adjust the buoyancy of the chamber 407 to alter the paravane's depth. For example, the controller 405 can operate a valve or pump 407 and can flood or evacuate water in the chamber 407 filled with air. In fact, the buoyancy element 406 for the paravane 400 can use depth control components similar to the depth controlled float discussed above with reference to FIGS. 6-7 and in the incorporated parent applications.

For further reference, FIG. 10O shows a perspective view of only a portion of the streamer spread. A paravane 400 according to the present disclosure is shown coupled to lines 62, 63, 66, and 68 in relation to a lead-in cable 65, a head float 350, and a streamer 60. Again, the paravane 400 has a frame 404 holding one or more louvers or vanes 402 intended to engage the water when towed therein. Also, the paravane 400 can have a buoyancy element or float 406 disposed thereon or connected thereto that is intended to make the paravane 400 neutrally buoyant at a predetermined depth. The towline 62 connected from the skeg (not shown) couples to deflector straps 63 connected to the paravane 400. The spur line 66 connects from there to the lead-in cable 65 and the spreader rope 68 for the streamer 60 shown. This arrangement is meant to be exemplary as other arrangements can be used depending on the implementation.

4. Control Devices

Figure 11A:
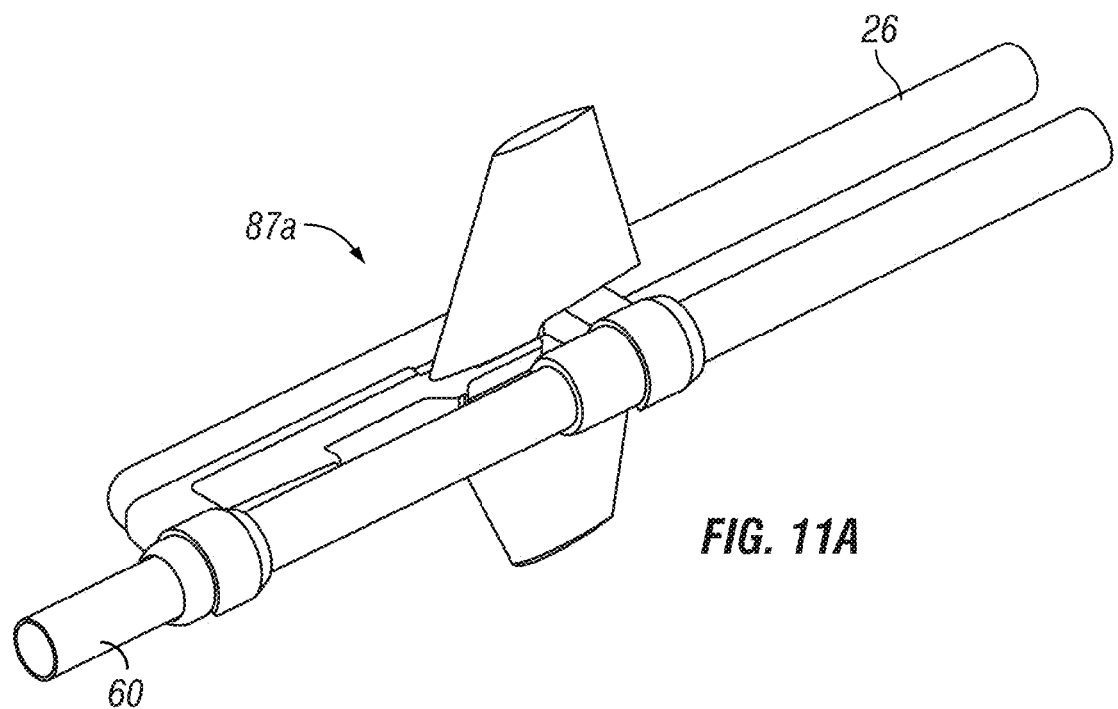
FIG. 11A shows a perspective view of a controllable fin according to the present disclosure for the streamer of the disclosed marine seismic survey system.
Figure 11B:
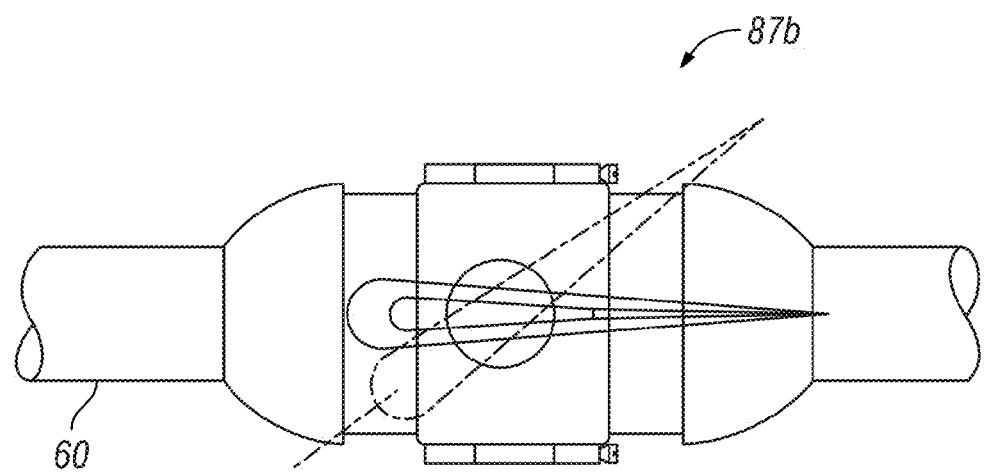
FIG. 11B shows a side view of a controllable wing according to the present disclosure for the streamer of the disclosed marine seismic survey system.

As noted above, the system 10 can use control devices 80 on the streamer 60 to control position and depth. For reference, FIG. 11A shows a perspective view of a controllable fin 87a that can be used to steer a streamer 60 (i.e., control the lateral position of the streamer 60). In addition, FIG. 11B shows a side view of a controllable wing 87b that can be used to control the depth (i.e., vertical position) of a streamer 60. Details of such devices having fins or wings deployable on a cable for controlling the lateral or vertical position of a streamer cable can be found in U.S. Pat. Nos. 6,525,992; 7,092,315; 7,206,254; and 7,423,929, which are each incorporated herein by reference. Another suitable device that can be used for deploying towed equipment and getting the required separation is disclosed in WO2013/059926.

These controllable fins or wings 87a-b in the system 10 can be DIGIFIN™ streamer steering systems available from ION Geophysical to steer the streamers. They can also be DIGIBIRD™ streamer steering systems available from ION Geophysical to control the depth of the towed streamers. (DIGIBIRD is registered trademarks of ION Geophysical Corporation.)

Control of the fins or wings 87a-b and determination of the location of the sensors 70 can be performed using a control system (40: FIGS. 6-7) on the vessel 30 and available software. Other devices that can also be used include the Compass Bird streamer systems available from ION Geophysical for providing compass heading information and depth measurement and control. Moreover, the control system (40) and available software can control the various fins and wings 87a-b to avoid ice bergs or large chunks of ice that may happen to travel at the surface over the array (20) of streamers (60) and potentially has a depth sufficient to damage the submerged streamers (60).

E. Position Monitoring of Towed Components with Signals

In addition to controlling the buoyancy and position of the 3-D spread 20 of streamers 60 using the components and techniques disclosed above, operations requires adequate monitoring and tracking of the position of the source 200 and seismic streamers 60 in the spread 20 as seismic data is recorded so that proper imaging can be performed. Because the towed components are below the water's surface, some conventional techniques for monitoring and tracking positions cannot be used.

As briefly shown in FIG. 5A, determining the positioning of the seismic system's streamers 60 and sensors 70 uses a fully braced acoustic network. The network determines position along the streamer spread 20 in a two dimensional plane and further determines position in a three dimensional plane between the vessel 30 and streamer's head floats 350. The two dimensional positioning uses cross-bracing between the streamers 60. The three-dimensional positioning uses a tow fish 510 positioned below the front-end of the spread 20 at a different depth than the streamers 60.

Figure 12:
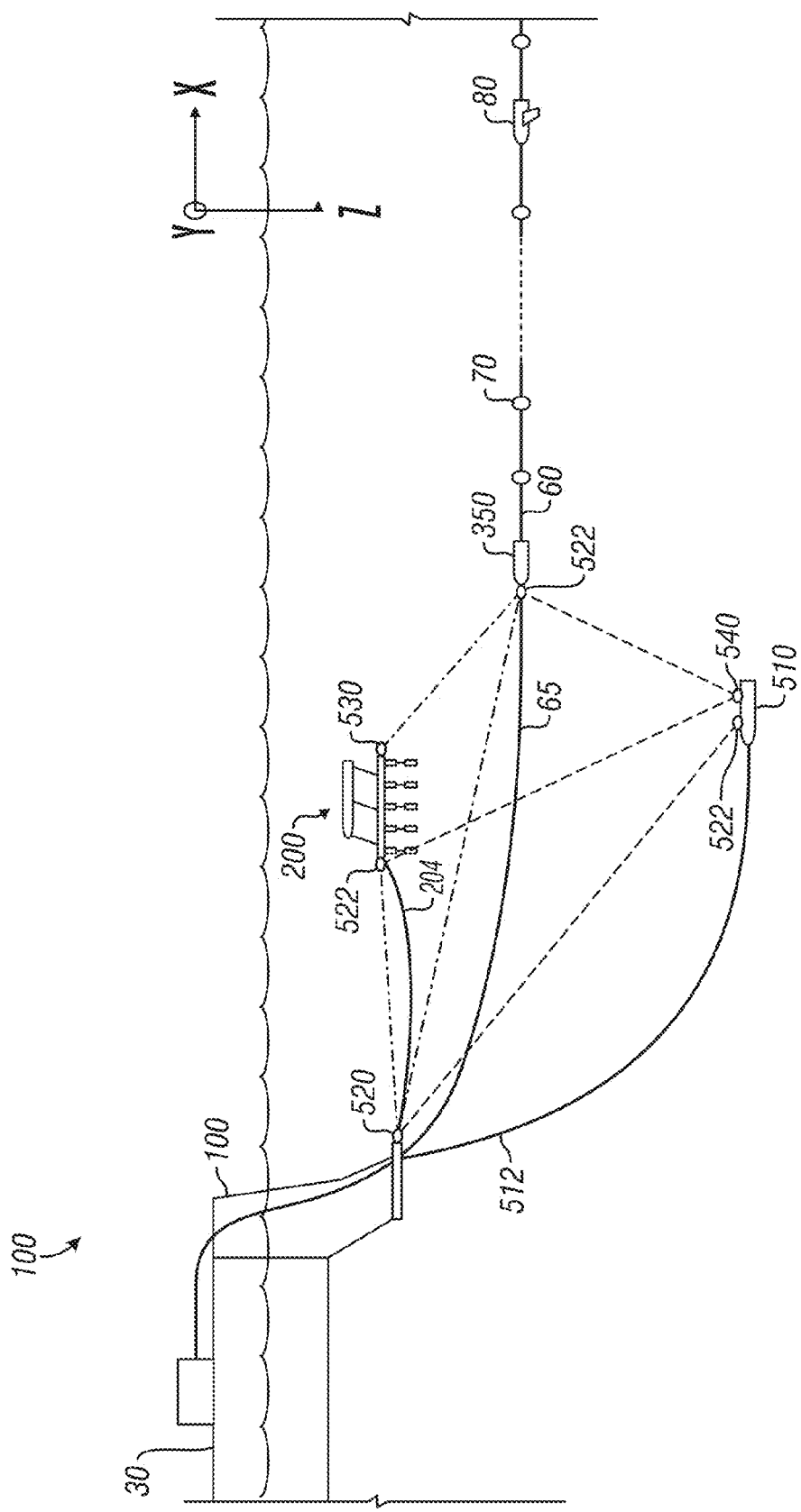
FIG. 12 shows a side view of positioning components according to the present disclosure for the disclosed marine seismic survey system.

As shown in more detail in FIG. 12, one or more transceivers 520 at the vessel 30 interrogate a transponder 522 located on the one or more sources 200 to determine the position of the seismic sources 200 during seismic operations. Likewise, the one or more transceivers 520 at the vessel 30 can interrogate transponders 522 located on the head floats 350 of the streamers 60 to determine the head positions of the seismic streamers 60 during seismic operations. Alternatively, one or more transceivers 530 on the sources 200 can interrogate the transponders 522 located on the head float(s) 350 for the same purpose, if there are limitations to the signaling.

To provide an additional plane of position information, the tow fish 510 is towed behind the vessel 30 (e.g., from the skeg 100) using a cable or tow line 512 at a lower depth than the streamers 60 of the spread 20. The one or more transceivers 520 at the vessel 30 interrogate a transponder 522 located on the tow fish 510, and one or more transceivers 540 on the tow fish 510 interrogate the transponder 522 located on the source 200 and the transponders 522 on the head floats 350 of the streamers 60.

In conventional 3-D seismic surveying, the source 200 and streamers 60 are towed near the water's surface, which provides a consistent plane, and GPS readings can be obtained of the component's positions to monitor and track this information during the survey. In the present system 10, however, the towed spread 20 of the streamers 60 and sources 200 are below the surface of the water so that the system 10 lacks such consistent position and precise information. Instead, the tow fish 510 interrogates the planar spread 20 above and provides a non-planar network without the use of surface GPS. In this way, the position information provided by the tow fish 510 helps further refine the other position information obtained with the system 10 so that the processing and imaging of the seismic data can be refined.

Various types of transceivers 520, 530, 540 can be used to at least determine distance to the transponders 522. Preferably, the transceivers 520, 530, 540 can determine distance as well as direction (bearing). For example, the transceivers 520, 530, 540 can be acoustic transceivers, such as Ultra Sort Base Line transceivers to provide distance and direction information. The transceivers 520, 530, 540 can use other acoustic positioning signals, such as short base line signals and long base line signals.

To strengthen the front acoustic network, the tow fish 510 with its upward looking deep towed acoustic platform provides ranges in three dimensions. This allows the system 10 to measure the depths of the various towed components. Motion of the tow fish 510 is compensated for so that either a ranging or USBL acoustic system can be utilized. Inertial navigation systems on the tow fish 510 can also monitor and track its position.

Figure 13:
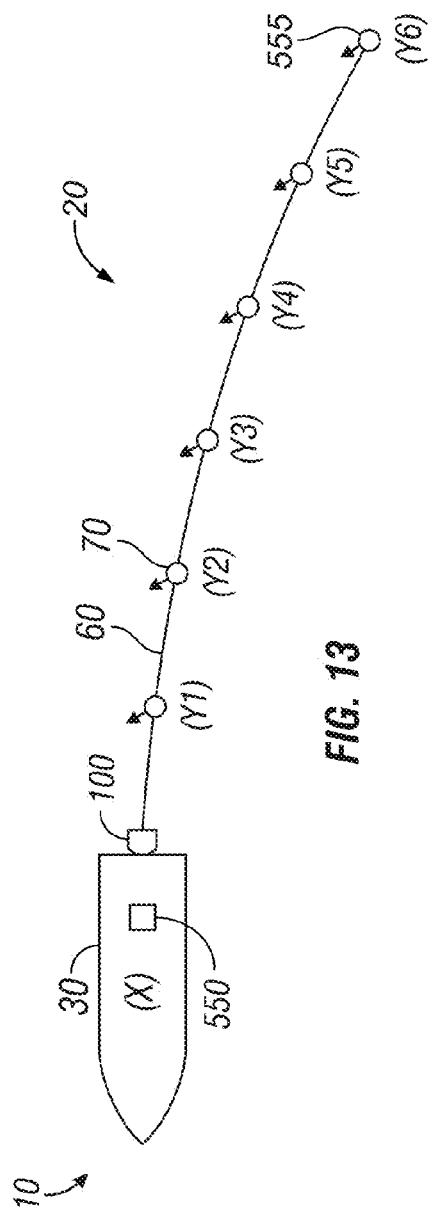
FIGS. 13-14 show plan views of cross-bracing equipment for the disclosed marine seismic survey system.

Additional positioning of the streamers 60 and other components in the spread 20 can use cross-bracing, dead-reckoning, and other techniques. For example, FIG. 13 shows just a portion of the system 10 having one of steamers 60 with sensors 70 positioned thereon for determining the shape of the streamer 60. The system 10 uses a GPS reading (x) for the vessel 30, known sensor locations (Y1-Y5), a known tail location (Y6) along the streamer 60, and various compass headings. As shown, data about the sensors 70 and tail location on the streamer 60 (including each of their positions (Y) on the streamer 60, compass headings corrected by declination, and the like) can be used to estimate the location of points on the streamer 60 and derive the streamer's shape. Combined with the vessel's GPS reading (X) using the onboard GPS receiver 550, all of this data can be integrated with the position data from an inertial navigating system to correct its drift error. If possible, a tail device 555 can at least intermittently obtain GPS readings.

Figure 14:
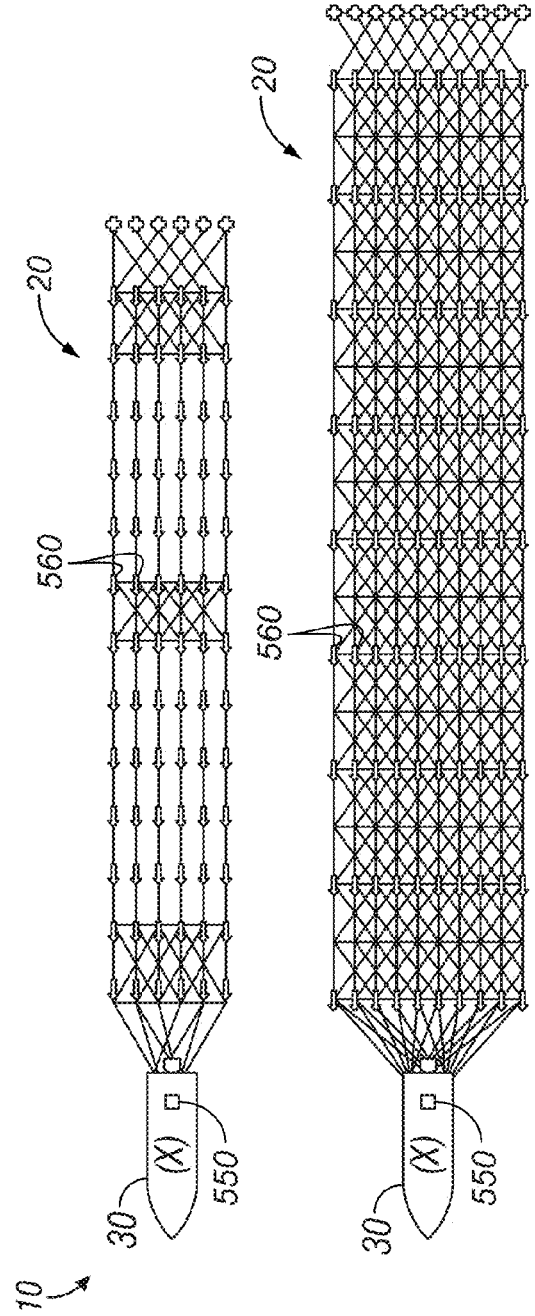

As shown in the systems 10 of FIG. 14, for example, different arrangements of acoustic systems for performing acoustic cross-bracing can be used to determine the streamers' positions in the spread 20. Each steamer 60 towed from the vessel 30 can have acoustic sensors 560 distributed thereon so that acoustic signals detected between the steamers 60 can use cross-bracing techniques to triangulate the positions of the steamers 60.

The foregoing description of preferred and other embodiments is not intended to limit or restrict the scope or applicability of the inventive concepts conceived of by the Applicants. The teachings of the present disclosure can apply to 2-D, 3-D, and 4-D seismic surveying in icy or obstructed waters, as well under normal marine seismic conditions. In fact, the teachings of the present disclosure can be used in any environment—not just those prone to physical obstructions or obstacles. For example, weather, large swells, noise, any conventional hazards, and even normal conditions encountered in marine seismic surveys can benefit from the systems of the present disclosure.

Moreover, aspects and techniques discussed in conjunction with one particular embodiment, implementation, or arrangement disclosed herein can be used or combined with aspect and techniques discussed in others disclosed herein. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of constructing a seismic spread having an arrangement of towed components to be neutrally buoyant in water when towed in a seismic survey, the towed components at least including streamers and paravanes, the method comprising:
   determining immersed weight and drag of the towed components;
   calculating drag forces versus buoyancy required to neutrally buoy the towed components at at least one tow speed in the water based on the determined weight and drag of the towed components;
   configuring floatation for the seismic spread based on the calculated drag forces versus buoyancy; and
   constructing the arrangement of the towed components in the seismic spread with the configured floatation.

2. The method of claim 1, comprising, after configuring the floatation, determining drag for the configured floatation and recalculating the drag forces versus buoyancy required to neutrally buoy the towed components at the at least one tow speed in the water based on the determined weight and drag of the towed components and the determined drag for the configured floatation.

3. The method of claim 1, wherein configuring the floatation for the seismic spread based on the calculated drag forces versus buoyancy comprises configuring the floatation with a range of adjustable buoyancy.

4. The method of claim 3, wherein configuring the floatation with the range of adjustable buoyancy comprises determining that the range of adjustable buoyancy meets a tolerance.

5. The method of claim 3, wherein configuring the floatation with the range of adjustable buoyancy comprises determining that the range of adjustable buoyancy does not meet a tolerance; and wherein the method further comprises configuring additional floatation for the seismic spread.

6. The method of claim 1, wherein calculating the drag forces versus buoyancy comprises hydraulically modelling the drag forces and the buoyancy for the configured seismic spread.

7. The method of claim 1, wherein configuring the floatation for the seismic spread based on the calculated drag forces versus buoyancy comprises configuring first floats for the streamers of the seismic spread.

8. The method of claim 1, wherein configuring the floatation for the seismic spread based on the calculated drag forces versus buoyancy comprises configuring second floats for the paravanes of the seismic spread.

9. The method of claim 1, further comprising configuring additional floatation for a seismic source towed in the seismic survey.

10. The method of claim 1, further comprising:
calculating trim forces required to maintain the streamers of the seismic spread having the configured floatation at at least one desired depth in the water in relation to one or more deviating variables of the seismic survey;
configuring one or more active surfaces for controlling the seismic spread based on the calculated trim forces; and
constructing the arrangement of the towed components in the seismic spread with the one or more configured active surfaces.

11. The method of claim 10, wherein the one or more deviating variables of the seismic survey are selected from the group consisting of a desired tow speed, a course change, an environmental condition, water salinity, water temperature, and ocean current.

12. The method of claim 10, wherein constructing the arrangement of the towed components in the seismic spread with the one or more configured active surfaces comprises installing one or more controllable foils having the one or more active surfaces on one or more of the streamers.

* * * * *